(12) United States Patent
Sarkar et al.

(10) Patent No.: US 10,318,896 B1
(45) Date of Patent: Jun. 11, 2019

(54) COMPUTING RESOURCE FORECASTING AND OPTIMIZATION

(71) Applicant: Amazon Technologies, Inc., Reno, NV (US)

(72) Inventors: Ayan Roy Sarkar, Seattle, WA (US); Harsha Ramalingam, Kirkland, WA (US)

(73) Assignee: Amazon Technologies, Inc., Reno, NV (US)

( * ) Notice: Subject to any disclaimer, the term of this patent is extended or adjusted under 35 U.S.C. 154(b) by 991 days.

(21) Appl. No.: 14/491,762

(22) Filed: Sep. 19, 2014

(51) Int. Cl.
*G06Q 10/06* (2012.01)

(52) U.S. Cl.
CPC .............................. *G06Q 10/0631* (2013.01)

(58) Field of Classification Search
None
See application file for complete search history.

(56) References Cited

U.S. PATENT DOCUMENTS

| | | | |
|---|---|---|---|
| 5,615,121 A * | 3/1997 | Babayev | G06Q 10/06 700/100 |
| 5,809,121 A | 9/1998 | Elliott et al. | |
| 5,930,344 A | 7/1999 | Relyea et al. | |
| 6,735,553 B1 * | 5/2004 | Frogner | H04L 41/142 370/469 |
| 6,823,054 B1 * | 11/2004 | Suhm | H04M 3/36 379/112.01 |
| 6,865,426 B1 * | 3/2005 | Schneck | H04L 63/105 370/246 |
| 6,877,035 B2 * | 4/2005 | Shahabuddin | G06Q 10/06 709/226 |
| 7,023,979 B1 * | 4/2006 | Wu | H04M 3/5233 379/265.11 |
| 7,054,943 B1 * | 5/2006 | Goldszmidt | G06F 9/505 370/231 |

(Continued)

FOREIGN PATENT DOCUMENTS

| | | | |
|---|---|---|---|
| EP | 1372073 A2 * | 12/2003 | G06F 9/5066 |
| EP | 1372073 A2 * | 12/2003 | G06F 9/5066 |

(Continued)

OTHER PUBLICATIONS

Jogalekar, Prasad, and Murray Woodside. "Evaluating the scalability of distributed systems." IEEE Transactions on parallel and distributed systems11.6 (2000): 589-603.*

(Continued)

*Primary Examiner* — Matthew S Gart
*Assistant Examiner* — Derick J Holzmacher
(74) *Attorney, Agent, or Firm* — Robert C. Kowert; Meyertons, Hood, Kivlin, Kowert & Goetzel, P.C.

(57) ABSTRACT

Methods, systems, and computer-readable media for implementing computing resource forecasting and optimization are disclosed. A projected service call volume is determined for a particular service for a future period of time. A set of computing resources is determined to support the projected service call volume for the particular service. The set of computing resources is determined based on automated analysis of the projected service call volume and is calibrated for throughput for the particular service. The set of computing resources is allocated to provide the particular service for the future period of time.

20 Claims, 19 Drawing Sheets

(56) References Cited

U.S. PATENT DOCUMENTS

| | | | |
|---|---|---|---|
| 7,209,548 B2 | 4/2007 | Ethier et al. | |
| 7,269,253 B1* | 9/2007 | Wu | H04M 3/5233 |
| | | | 379/265.11 |
| 7,372,952 B1* | 5/2008 | Wu | H04M 3/5233 |
| | | | 370/352 |
| 7,388,839 B2* | 6/2008 | Chafle | H04L 12/5695 |
| | | | 370/236 |
| 7,496,799 B2 | 2/2009 | Prang et al. | |
| 7,594,006 B2* | 9/2009 | Rolia | H04L 67/22 |
| | | | 709/200 |
| 7,676,034 B1* | 3/2010 | Wu | H04M 3/5233 |
| | | | 379/265.01 |
| 7,707,015 B2 | 4/2010 | Lubrecht et al. | |
| 7,984,151 B1* | 7/2011 | Raz | G06F 9/5083 |
| | | | 709/223 |
| 8,140,371 B2* | 3/2012 | Franz | G06Q 10/0631 |
| | | | 705/7.12 |
| 8,219,368 B1 | 7/2012 | Akella et al. | |
| 8,260,649 B2* | 9/2012 | Ramanujan | G06Q 10/06 |
| | | | 705/7.16 |
| 8,300,798 B1* | 10/2012 | Wu | H04M 3/5233 |
| | | | 379/265.11 |
| 8,396,204 B2* | 3/2013 | Guerrero | H04M 3/5175 |
| | | | 379/265.01 |
| 8,411,838 B2* | 4/2013 | Omiya | G06Q 10/04 |
| | | | 379/265.01 |
| 8,612,180 B2* | 12/2013 | Yan | G06F 9/5066 |
| | | | 702/127 |
| 8,654,629 B1 | 2/2014 | Craig et al. | |
| 8,891,744 B2* | 11/2014 | Jasper | H04M 3/5237 |
| | | | 379/112.01 |
| 8,909,567 B2* | 12/2014 | Kang | G06Q 10/00 |
| | | | 370/230 |
| 8,938,063 B1* | 1/2015 | Hackbarth | G06Q 10/00 |
| | | | 379/265.03 |
| 8,971,520 B1* | 3/2015 | Bryce | H04M 3/00 |
| | | | 379/265.11 |
| 2002/0107720 A1* | 8/2002 | Martin | G06Q 10/06 |
| | | | 705/7.24 |
| 2002/0120744 A1* | 8/2002 | Chellis | G06F 9/50 |
| | | | 709/226 |
| 2003/0093527 A1* | 5/2003 | Rolia | G06F 9/50 |
| | | | 709/226 |
| 2003/0154112 A1* | 8/2003 | Neiman | G06F 9/5044 |
| | | | 705/5 |
| 2004/0138936 A1* | 7/2004 | Johnson | G06Q 10/06314 |
| | | | 705/7.24 |
| 2004/0226015 A1* | 11/2004 | Leonard | G06F 9/5061 |
| | | | 718/100 |
| 2005/0065837 A1* | 3/2005 | Kosiba | G06Q 10/04 |
| | | | 705/7.13 |
| 2005/0256760 A1* | 11/2005 | Siddhanti | G06Q 30/02 |
| | | | 705/7.25 |
| 2006/0075079 A1* | 4/2006 | Powers | G06F 9/5072 |
| | | | 709/220 |
| 2006/0090163 A1* | 4/2006 | Karisson | G06F 11/3409 |
| | | | 718/105 |
| 2008/0172275 A1* | 7/2008 | Ramanujan | G06Q 10/06 |
| | | | 705/7.13 |
| 2008/0201459 A1* | 8/2008 | Vul | H04L 12/2602 |
| | | | 709/223 |
| 2008/0244600 A1* | 10/2008 | Wong | G06F 9/5083 |
| | | | 718/104 |
| 2008/0271038 A1* | 10/2008 | Rolia | G06F 9/505 |
| | | | 718/105 |
| 2008/0271039 A1* | 10/2008 | Rolia | G06Q 10/06 |
| | | | 718/105 |
| 2009/0046665 A1* | 2/2009 | Robson | H04W 36/04 |
| | | | 370/332 |
| 2010/0088205 A1* | 4/2010 | Robertson | G06Q 20/102 |
| | | | 705/34 |
| 2010/0269119 A1* | 10/2010 | Arimilli | G06F 9/5011 |
| | | | 719/313 |
| 2011/0255675 A1* | 10/2011 | Jasper | H04M 3/5237 |
| | | | 379/112.1 |
| 2012/0087486 A1* | 4/2012 | Guerrero | H04M 3/5175 |
| | | | 379/265.02 |
| 2012/0144008 A1* | 6/2012 | Yuyitung | G06F 9/5066 |
| | | | 709/223 |
| 2012/0197686 A1* | 8/2012 | Abu El Ata | G06Q 10/06393 |
| | | | 705/7.39 |
| 2012/0330711 A1* | 12/2012 | Jain | G06F 9/5072 |
| | | | 705/7.23 |
| 2013/0041871 A1* | 2/2013 | Das | G06F 17/30896 |
| | | | 707/662 |
| 2013/0041989 A1* | 2/2013 | Boss | G06F 9/505 |
| | | | 709/223 |
| 2013/0138816 A1* | 5/2013 | Kuo | G06F 9/5011 |
| | | | 709/226 |
| 2013/0156557 A1* | 6/2013 | Green | B21D 22/00 |
| | | | 415/182.1 |
| 2014/0181267 A1* | 6/2014 | Wadkins | H04L 69/163 |
| | | | 709/219 |

FOREIGN PATENT DOCUMENTS

| | | | | |
|---|---|---|---|---|
| EP | 1693763 A1 * | 8/2006 | | G06F 9/5027 |
| EP | 1693763 A1 * | 8/2006 | | G06F 9/5027 |
| WO | WO-2004081789 A2 * | 9/2004 | | G06F 11/008 |
| WO | WO 2013147660 A1 * | 10/2013 | | H04W 36/22 |
| WO | WO-2013147660 A1 * | 10/2013 | | H04W 36/22 |

OTHER PUBLICATIONS

Appleby, Karen, and German Goldszmidt. "Using automatically derived load thresholds to manage compute resources on-demand." Integrated Network Management, 2005. IM 2005. 2005 9th IFIP/IEE International Symposium on. IEEE, 2005.*

Jogalekar, Prasad, and Murray Woodside. "Evaluating the scalability of distributed systems." IEEE Transactions on parallel and distributed systems11.6 (2000): 589-603. (Year: 2000).*

Appleby, Karen, and German Goldszmidt. "Using automatically derived load thresholds to manage compute resources on-demand." Integrated Network Management, 2005. IM 2005. 2005 9th IFIP/IEE International Symposium on. IEEE, 2005. (Year: 2005).*

Rodrigo Fonseca, George Porter, Randy H. Katz, Scott Shenker, and Ion Stoica, "X-Trace: A Pervasive Network Tracing Framework," 4th USENIX Symposium on Networked Systems Design & Implementation (NSDI'07), Apr. 2007, pp. 1-14.

Benjamin H. Sigelman, Luiz Andre Barroso, Mike Burrows, Pat Stephenson, Manoj Plakal, Donald Beaver, Saul Jaspan, and Chandan Shanbhag, "Dapper, a Large-Scale Distributed Systems Tracing Infrastructure," Google Technical Report dapper-2010-1, Apr. 2010, pp. 1-14.

U.S. Appl. No. 14/491,438, filed Sep. 19, 2014, Harsha Ramalingam.

* cited by examiner

COMPUTING RESOURCE FORECASTING AND OPTIMIZATION

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. However, as the scale and scope of distributed systems have increased, the tasks of provisioning, administering, and managing the resources have become increasingly complicated.

Web servers backed by distributed systems may provide marketplaces that offer goods and/or services for sale to consumers. For instance, consumers may visit a merchant's website to view and/or purchase goods and services offered for sale by the merchant (and/or third party merchants). Some network-based marketplaces (e.g., Internet-based marketplaces) include large electronic catalogues of items offered for sale. For each item offered for sale, such electronic catalogues typically include at least one product detail page (e.g., a web page) that specifies various information about the item, such as a description of the item, one or more pictures of the item, as well as specifications (e.g., weight, dimensions, capabilities) of the item. In various cases, such network-based marketplaces may rely on a service-oriented architecture to implement various business processes and other tasks. The service-oriented architecture may be implemented using a distributed system that includes many different computing resources and many different services that interact with one another, e.g., to produce a product detail page for consumption by a client of a web server.

In implementing such a distributed system, the acquisition and operation of computing hardware may represent a significant cost. However, forecasting the number of hosts needed to run the distributed system may be prone to error, particularly when estimates of demand are calculated manually. If an organization errs on the side of excess capacity, then low utilization and unnecessary costs may result. If an organization errs on the side of insufficient capacity, then service-level agreements may be breached.

Figure 1:
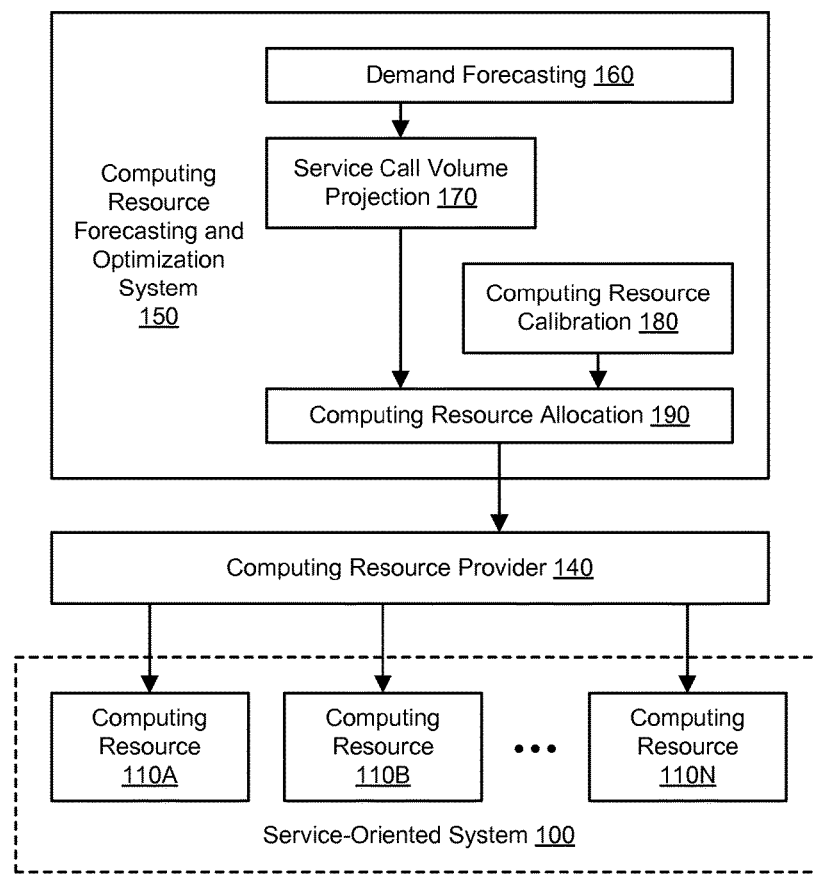
FIG. 1 illustrates an example system environment for computing resource forecasting and optimization, including service call volume projection based on demand forecasting, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for computing resource forecasting and optimization are described. Using the systems and methods described herein, service call volumes may be projected or forecasted for services in a service-oriented system. The service call volumes may be projected for a future period of time based on a forecast for one or more demand drivers. Alternatively, the service call volumes may be forecasted based on any suitable technique(s), including automated analysis of trace data and/or time-series analysis of service call volume history. For each service, an optimum set of computing resources is determined that will support the projected service call volume. The computing resources may be calibrated for throughput for the particular service. A resource count (e.g., a host count for a set of calibrated hosts) may be determined based on a throughput metric, e.g., an efficiency index that indicates optimum throughput divided by a peak actual throughput for the particular service over a period of time. The optimum set of calibrated computing resources may then be allocated to provide the particular service for the future period of time in order to handle the projected service call volume. The forecasting, calibration, and allocation may be performed multiple times for successive future periods of time. In this manner, the quantity and/or configuration of computing resources may be continuously or repeatedly optimized in a service-oriented system.

Various embodiments of methods and systems for automated services capacity modeling are described. Using the systems and methods described herein, interactions between services (e.g., service requests and service responses) in a distributed system may be monitored by individual services. Based on the trace data generated by the monitoring, relationships between the services may be determined. For example, call graph(s) (or portions thereof) may be generated that indicate a set of applications that invoke a particular service. Using the trace data, a capacity modeling system may determine demand drivers for a particular application. The demand drivers may be responsible for driving demand for the particular service, e.g., by the set of applications. Based on the demand drivers, the capacity modeling system may determine the total call volume to the particular service (e.g., by determining the individual call volume from the individual demand drivers). The capacity modeling system may then determine a capacity forecast for the particular service based on the total call volume. The capacity forecast may indicate an optimized quantity of computing resources to provide the service. In this manner, the cost and/or performance of the service-oriented system may be optimized.

FIG. 1 illustrates an example system environment for computing resource forecasting and optimization, including service call volume projection based on demand forecasting, according to some embodiments. The example system environment may include a service-oriented system 100 and a computing resource forecasting and optimization system 150. The service-oriented system 100 may implement a service-oriented architecture using a plurality of computing resources, such as computing resources 110A and 110B through 110N. Although three computing resources 110A and 110B through 110N are illustrated for purposes of example, it is contemplated that any suitable number of computing resources may be used with the service-oriented system 100. The computing resources 110A-110N may include any suitable hosts, processing resources, storage resources, memory resources, network resources, power resources, and/or any other suitable types of resources. Any hosts may be implemented by the example computing device 3000 illustrated in FIG. 16. The hosts may be coupled using one or more networks, and the hosts may be located in any suitable number of data centers or geographical locations. The service-oriented system may use the computing resources 110A-110N to provide or otherwise implement a plurality of services. The services may be configured to communicate with each other (e.g., through message passing) to carry out various tasks, such as business functions.

Each service may be configured to perform one or more functions upon receiving a suitable request. For example, a service may be configured to retrieve input data from one or more storage locations and/or from a service request, transform or otherwise process the data, and generate output data. In some cases, a first service may call a second service, the second service may call a third service to satisfy the request from the first service, and so on. For example, to build a web page dynamically, numerous services may be invoked in a hierarchical manner to build various components of the web page. In some embodiments, services may be loosely coupled in order to minimize (or in some cases eliminate) interdependencies among services. This modularity may enable services to be reused in order to build various applications through a process referred to as orchestration. A service may include one or more components that may also participate in the service-oriented system, e.g., by passing messages to other services or to other components within the same service.

The service-oriented system 100 may be configured to process requests from various internal or external systems, such as client computer systems or computer systems consuming networked-based services (e.g., web services). For instance, an end-user operating a web browser on a client computer system may submit a request for data (e.g., data associated with a product detail page, a shopping cart application, a checkout process, search queries, etc.). In another example, a computer system may submit a request for a web service (e.g., a data storage service, a data query, etc.). In general, services may be configured to perform any of a variety of business processes.

The services described herein may include but are not limited to one or more of network-based services (e.g., a web service), applications, functions, objects, methods (e.g., objected-oriented methods), subroutines, or any other set of computer-executable instructions. In various embodiments, such services may communicate through any of a variety of communication protocols, including but not limited to the Simple Object Access Protocol (SOAP). In various embodiments, messages passed between services may include but are not limited to Extensible Markup Language (XML) messages or messages of any other markup language or format. In various embodiments, descriptions of operations offered by one or more of the services may include Web Service Description Language (WSDL) documents, which may in some cases be provided by a service broker accessible to the services and components. References to services herein may include components within services.

The computing resource forecasting and optimization system 150 may include one or more modules, components, or other units of functionality configured for forecasting and allocating computing resources which are usable to provide or implement, in an efficient manner, one or more services for one or more future periods of time. In one embodiment, the computing resource forecasting and optimization system 150 may include a demand forecasting functionality 160, a service call volume projection functionality 170, a computing resource calibration functionality 180, and a computing resource allocation functionality 190. In various embodiments, portions of the functionality of the computing resource forecasting and optimization system 150, including the various functionalities 160-190, may be provided by the same computing device or by any suitable number of different computing devices. If any of the components of the computing resource forecasting and optimization system 150 are implemented using different computing devices, then the components and their respective computing devices may be communicatively coupled, e.g., via a network. Each of the illustrated components may represent any combination of software and hardware usable to perform their respective functions. It is contemplated that the service-oriented system 100 and/or computing resource forecasting and optimization system 150 may include additional components not shown, fewer components than shown, or different combinations, configurations, or quantities of the components shown.

Figure 16:
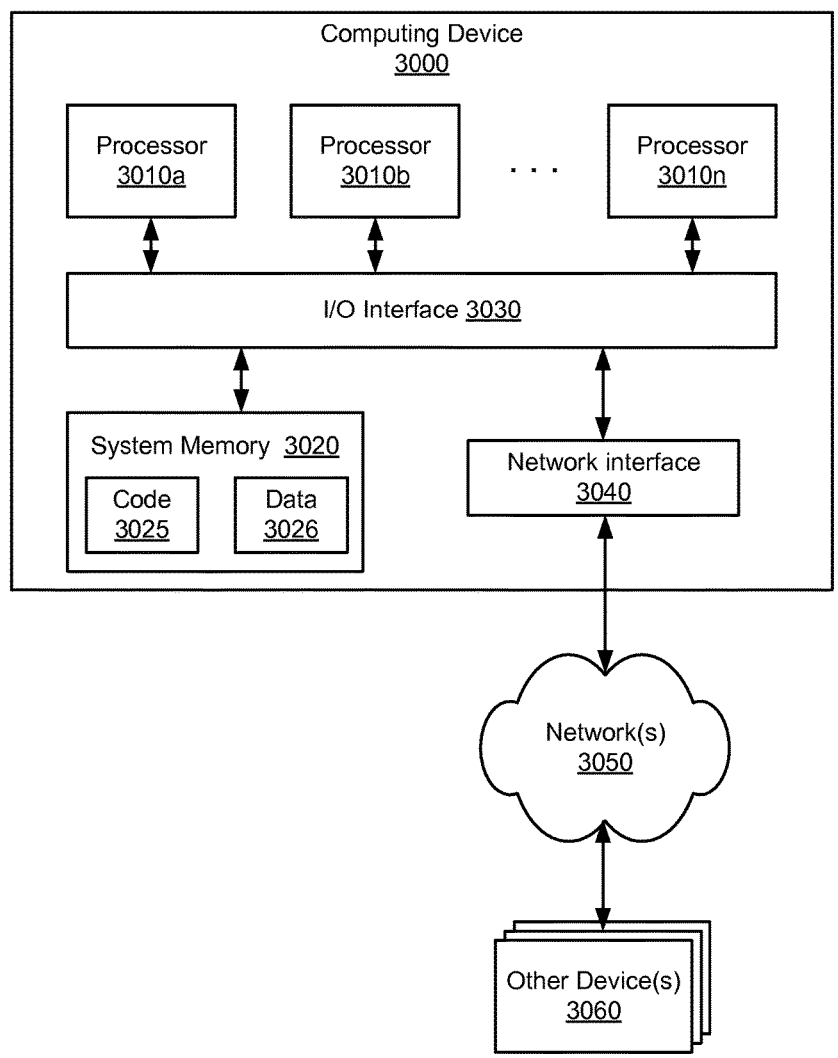
FIG. 16 illustrates an example of a computing device that may be used in some embodiments.

The computing resource forecasting and optimization system 150 may be implemented using one or more instances of the example computing device 3000 illustrated in FIG. 16. In some embodiments, the computing resource forecasting and optimization system 150 may be implemented using any suitable number of virtual compute instances and/or physical compute instances. The virtual compute instances and/or physical compute instances may be offered to clients, provisioned, and maintained by a provider network (such as computing resource provider 140) that manages computational resources, memory resources, storage resources, and network resources. A virtual compute instance may comprise one or more servers with a specified computational capacity (which may be specified by indicating the type and number of CPUs, the main memory size, and so on) and a specified software stack (e.g., a particular version of an operating system, which may in turn run on top of a hypervisor).

In one embodiment, the demand forecasting functionality 160 may determine forecasts for one or more demand drivers for one or more future periods of time. The demand drivers may be determined on any suitable basis. In one embodiment, the demand drivers may be determined based on econometric models for business drivers, e.g., elements that drive aspects of a business or other organization. For example, the business drivers may include page views for an online marketplace or other web-based organization. As another example, the business drivers may include an order volume or other traffic-based metrics for orders placed by customers with an online marketplace. The demand drivers may be forecasted using manual and/or automatic and programmatic techniques. The accuracy of the models may be reviewed manually or automatically on a recurring basis, and the models may be revised to improve them or adapt to changing conditions. The future period of time may represent a "lead time" necessary to allocate, acquire, provision, and/or configure computing resources, e.g., to provide a particular service. The future period of time may represent any suitable duration of time, e.g., from years to months to days to hours. In various embodiments, the demand drivers may be forecasted for a particular service, for multiple services, or not in relation to a particular service at all. Further aspects of demand drivers are discussed below with respect to FIG. 5A, FIG. 5B, FIG. 6, FIG. 7, and FIG. 9.

In one embodiment, the service call volume projection functionality 170 may determine a projected service call volume for a particular service for a future period of time. Again, the future period of time may represent a "lead time" necessary to allocate, acquire, provision, and/or configure computing resources, e.g., to provide a particular service. The future period of time may represent any suitable duration of time, e.g., from years to months to days to hours. The projected service call volume may be determined based on the forecast for the demand drivers. The projected service call volume may be determined on any suitable basis. In one embodiment, the projected service call volume may be determined based on automated analysis of trace data for services in a service-oriented system. The automated analysis of the trace data may determine relationships between the particular service and individual demand drivers. In one embodiment, machine learning techniques may be used to automatically select algorithms to project the service call volume. The type of algorithm selected for projection of service call volume may vary from service to service, e.g., based on different constraining metrics for different services. Further aspects of projected service call volume are discussed below with respect to FIG. 5A, FIG. 5B, FIG. 6, FIG. 7, and FIG. 9. As shown in FIG. 7, for example, the capacity modeling system 1050 may be used to implement aspects of the service call volume projection functionality 170; in particular, the demand driver analysis functionality 1070 and the capacity forecaster 1080 may determine demand drivers for a particular service and a total call volume to the service for which the demand drivers are responsible.

In one embodiment, the computing resource calibration functionality 180 may calibrate, optimize, or otherwise configure computing resources to implement a particular service. The computing resources may be calibrated for throughput for the particular service. The calibration 180 may be based on throughput testing for particular classes of resources, such as particular host classes. The output of the calibration 180 may represent an optimum type and/or configuration of a resource for a particular service. The calibrated computing resources may be referred to herein as "optimized" or "optimum"; however, it is contemplated that the calibrated computing resources may represent a superior or improved solution but not necessarily an ideal solution. The calibrated computing resources may include one or more hosts, storage resources, memory resources, network resources, power resources, and/or any other suitable types of resources. The hosts within each host class may be calibrated in a homogeneous manner.

For each host being calibrated, the calibration functionality 180 may determine a constraining resource in that environment. For example, the constraining resources may include processor type, memory capacity, input/output operations per second (IOPS), network bandwidth, and/or storage capacity. The constraining resource may be determined using any suitable calibration tests, e.g., by testing different configurations of hosts for throughput for a particular service. The calibration functionality 180 may then ensure that the constraining resource is calibrated to the optimum limit. For example, a host may be calibrated so that it has excess CPU capacity in order to handle an additional load if one or more other hosts are offline. In one embodiment, calibration may be performed for horizontally scalable systems such that the calibrated host has linearly scalable performance within an operating range. In one embodiment, calibration may be performed for nonlinearly scalable systems such that the calibrated host can accommodate growth given a nonlinearity curve.

In one embodiment, the computing resource allocation functionality 190 may determine a resource count for the calibrated resources to support the projected service call volume. The resource count may be determined based on automated analysis of the projected service call volume. The resource count may include, for example, a host count for a set of calibrated hosts in each of one or more host classes. The host count may be determined based on a throughput metric, e.g., an efficiency index that indicates optimum throughput divided by a peak actual throughput for the particular service over a period of time. The efficiency index may be indicative of excess capacity, sufficient capacity, or insufficient capacity to support the projected service call volume for the particular service. For example, an efficiency index of less than 100% may indicate that a set of computing resources has insufficient capacity to support the projected service call volume, while an efficiency index of greater than 100% may indicate that a set of computing resources has excess capacity to support the projected service call volume. In one embodiment, the optimum, calibrated set of computing resources may typically have an efficiency index over 100% in order to account for unexpected peaks in service call volume.

The optimum, calibrated set of computing resources may be allocated to provide or otherwise implement the particular service for the future period of time. In one embodiment, at least a portion of the set of computing resources may be automatically allocated from a global pool of computing resources. The global pool may represent a plurality of computing resources that are available to various services in a service-oriented system, including the particular service. If the global pool is insufficient to fulfill the selected set of computing resources, then additional computing resources may be acquired, e.g., purchased or leased, in order to completely fulfill the selected set of computing resources.

In one embodiment, the computing resource allocation functionality 190 may allocate, de-allocate, provision, de-provision, and/or configure any of the computing resources 110A-110N. For example, the computing resource allocation functionality 190 may allocate, provision, and/or configure any of the computing resources 110A-110N in order to provide or otherwise implement the particular service in accordance with the optimized set of computing resources, e.g., for a future period of time. Using any suitable interface(s), the computing resource allocation functionality 190 may interact with a computing resource provider 140 to cause various ones of the computing resources 110A-110N to be allocated or provisioned for use with a particular service, de-allocated or de-provisioned, and/or appropriately configured.

Further aspects of the allocation of computing resources are discussed below with respect to FIG. 5A, FIG. 5B, FIG. 6, FIG. 7, and FIG. 9. As shown in FIG. 7, for example, the capacity modeling system 1050 may be used to implement aspects of the computing resource allocation functionality 190. In particular, the capacity forecaster 1080 may determine one or more resource counts for computing resources in the optimized set.

The calibration 180 may be performed continuously or repeatedly for a particular service. In one embodiment, the performance of the optimum set of computing resources may be monitored after the set of resources is calibrated for throughput for the particular service. If the performance is not within predetermined boundaries, then the computing resources may be recalibrated for throughput for the particular service. Due to the lead time between host allocation and host deployment, the calibration at the time of the allocation may be compared to the calibration at the time when the allocated host(s) are actually deployed. A calibration delta may represent the error between the forecast and the deployment that is attributable to the change in calibration. The calibration delta may be used to improve the cost and/or performance of the computing resource forecasting and optimization system 150, e.g., by correcting for expected calibration error for future allocations.

In one embodiment, the computing resource provider 140 may manage a provider network that includes the computing resources 110A-110N. The provider network may include numerous data centers hosting various resource pools, such as collections of physical and/or virtualized computer servers, storage devices, and networking equipment that are used to implement and distribute the infrastructure and services offered by the provider. The resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. In one embodiment, an operator of the provider network may implement a flexible set of resource reservation, control, and access interfaces for clients. For example, a provider network may implement a programmatic resource reservation interface (e.g., via a web site or a set of web pages) that allows clients to learn about, select, purchase access to, and/or reserve resources. Using such an interface, the computing resource forecasting and optimization system 150 may reserve various ones of the computing resources 110A-110N for a period of time.

Figure 2:
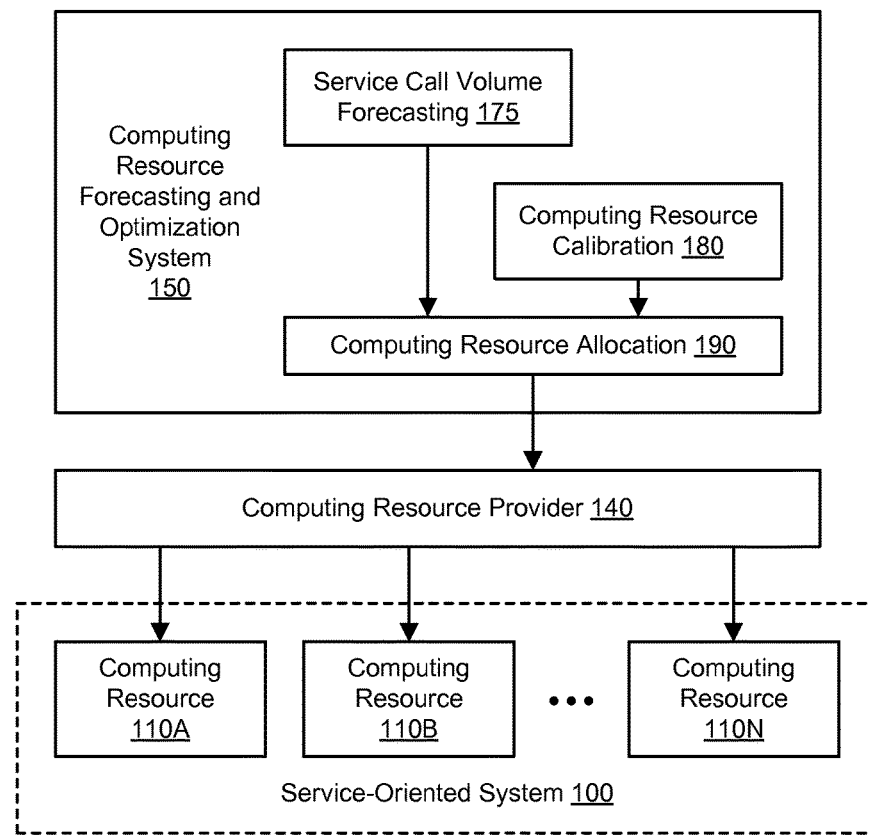
FIG. 2 illustrates an example system environment for computing resource forecasting and optimization in a manner independent of demand drivers, including service call volume forecasting, according to some embodiments.

FIG. 2 illustrates an example system environment for computing resource forecasting and optimization, including service call volume forecasting in a manner independent of demand drivers, according to some embodiments. In one embodiment, the computing resource forecasting and optimization system 150 may include a service call volume forecasting functionality 175. In one embodiment, the service call volume forecasting functionality 175 may determine a projected service call volume for a particular service for a future period of time. Again, the future period of time may represent a "lead time" necessary to allocate, acquire, provision, and/or configure computing resources, e.g., to provide a particular service. The future period of time may represent any suitable duration of time, e.g., from years to months to days to hours. The projected service call volume may be determined by the service call volume forecasting functionality 175 on any suitable basis. In one embodiment, the projected service call volume may be determined based on a time-series analysis of service call volume history for the particular service. Discontinuous inputs, such as anticipated one-time peaks in demand, may be added to the time-series analysis as one or more overlays. In one embodiment, machine learning techniques may be used to augment or replace the time-series analysis, e.g., to automatically select algorithms to project the service call volume. The type of algorithm selected for projection of service call volume may vary from service to service, e.g., based on different constraining metrics for different services. Further aspects of projected service call volume are discussed below with respect to FIG. 5A, FIG. 5B, FIG. 6, FIG. 7, and FIG. 9. As shown in FIG. 7, for example, the capacity modeling system 1050 may be used to implement aspects of the service call volume projection functionality 170; in particular, the capacity forecaster 1080 may determine a total call volume to a service.

Figure 3A:
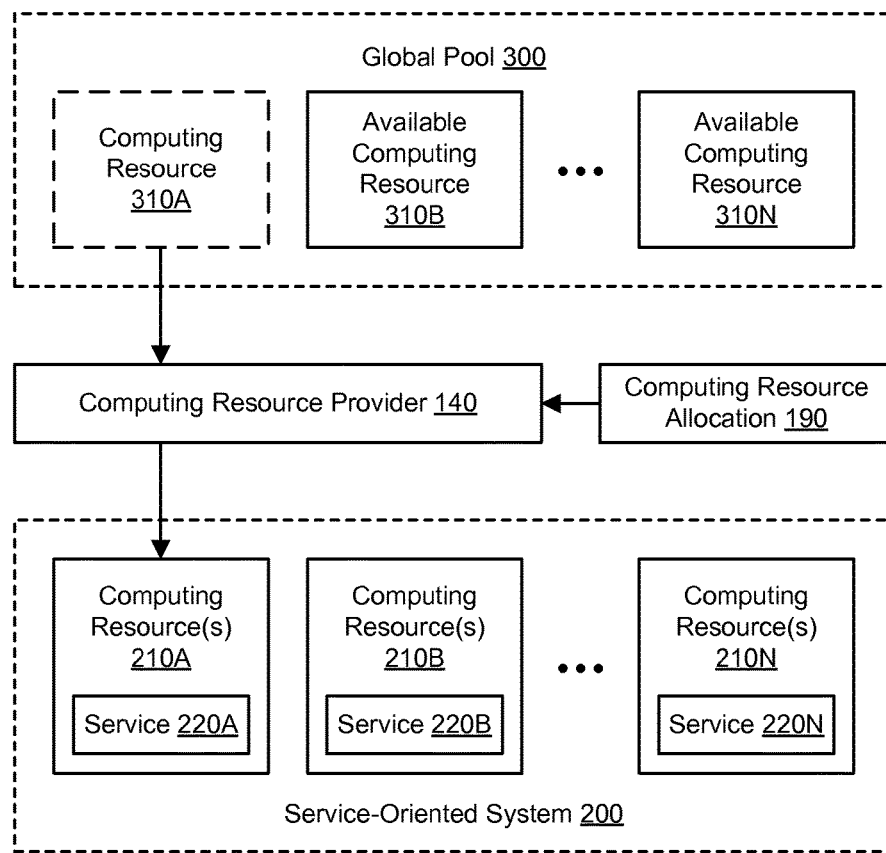
FIG. 3A illustrates further aspects of the example system environment for computing resource forecasting and optimization, including resource allocation from a global pool, according to some embodiments.

FIG. 3A illustrates further aspects of the example system environment for computing resource forecasting and optimization, including resource allocation from a global pool, according to some embodiments. A service-oriented system 200 may include a plurality of computing resources, such as resources 210A and 210B through 210N. Each set of computing resource(s) 210A-210N may provide or otherwise implement one or more services, such as service 220A provided by resource(s) 210A, service 220B provided by resource(s) 210B, and service 220N provided by resource(s) 210N. However, it is contemplated that service-oriented system 200 may include any suitable quantity and/or configuration of computing resources and/or services.

In one embodiment, at least a portion of the set of computing resources for a particular service may be automatically allocated from a global pool 300 of computing resources. The global pool 300 may represent a plurality of computing resources which are available to various services 220A-220N in a service-oriented system 200, including the particular service. The global pool 300 may include a plurality of computing resources such as resources 310A and 310B through 310N. Each set of computing resource(s) 310A-310N may be usable to provide or otherwise implement one or more services. However, it is contemplated that global pool may include any suitable quantity and/or configuration of computing resources. As shown in the example of FIG. 3A, the available computing resource 310A may be allocated to provide or otherwise implement the service 220A, potentially in collaboration with other computing resources. The computing resource 310A may be unavailable in the global pool 300 to other services (e.g., services 220B-220N) while it is being used to provide the service 220A. However, as shown in the example of FIG. 3A, other computing resources 310B-310N may remain available in the global pool 300.

In one embodiment, the allocation of computing resources from the global pool 300 may be managed by the computing resource provider 140, e.g., in response to requests by the computing resource allocation functionality 190. If the global pool 300 is insufficient to fulfill the selected set of computing resources, then additional computing resources may be acquired, e.g., purchased or leased, in order to completely fulfill the selected set of computing resources. In one embodiment, computing resources may be added to the global pool 300 from a resource marketplace and/or returned to the resource marketplace from the global pool. The resources in the marketplace may represent spot instances that are available to clients through a bidding process. A bid for a spot instance may indicate a cost per time period (e.g., per hour) that a potential client is willing to pay; if the bid meets or exceeds the current market price (i.e., the spot price), then the spot instances may be provided to the client. By comparing a potential cost for keeping such resources in the global pool 300 (e.g., the opportunity cost for making the resources unavailable to bidders in the resource marketplace) to a potential cost of having to pay to acquire the resources from the resource marketplace, the computing resource provider 140 may determine whether to keep a particular resource in the global pool or to place the resource in a marketplace. In this manner, the computing resource provider 140 may minimize the total cost of maintaining and operating the global pool 300.

In one embodiment, computing resources may be provided to a particular service through the global pool 300 and also from a dedicated pool for that particular service. Such a tiered pool may be implemented if resources could be deployed faster and/or at a lower cost from the dedicated pool than from the global pool 300. In this manner, the computing resource provider 140 may further optimize the cost and/or performance of providing resources to services.

Figure 3B:
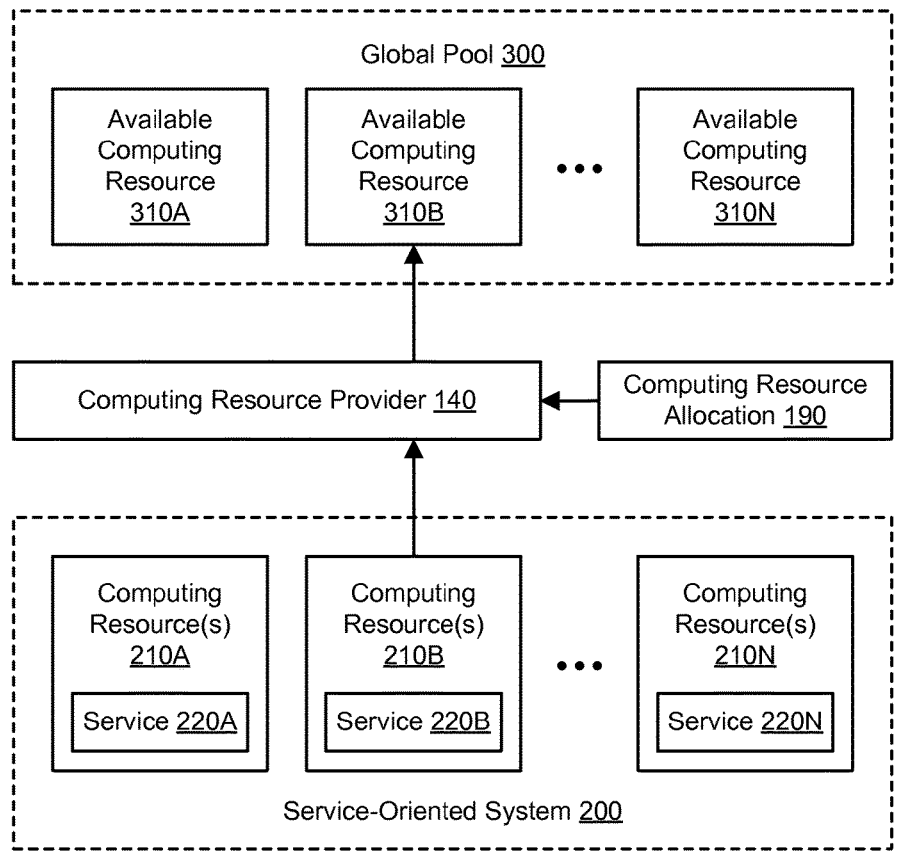
FIG. 3B illustrates further aspects of the example system environment for computing resource forecasting and optimization, including resource release to a global pool, according to some embodiments.

FIG. 3B illustrates further aspects of the example system environment for computing resource forecasting and optimization, including resource release to a global pool, according to some embodiments. In one embodiment, aspects of the computing resources forecasting and optimization may be performed continuously or many times for successive future time periods. For example, a new forecast for the demand drivers may be determined for a second period of time in the future, e.g., a period following the original period (and potentially overlapping the original period). Based on the new forecast for the demand drivers, a projected service call volume (i.e., a new projection) may be determined for the particular service for the future period of time. Another (e.g., a second) set of computing resources may be determined to support the newly projected service call volume for the particular service. The second set of computing resources may be allocated to support for the service for the second period of time. In one embodiment, additional computing resources may be allocated from the global pool 300 or otherwise acquired to provide or implement the particular service for the second period of time. In one embodiment, if the second set of computing resources is smaller than the original set, then portions of the original set may be returned to the global pool 300 and made available to other services. If the second set contains fewer hosts than the first set, then the difference in hosts may be returned to the global pool. As shown in the example of FIG. 3B, a computing resource 310B may be automatically returned or released to the global pool after being used to provide the service 220B. The computing resource 310B may be available to any of the services 220A-220N. In this manner, the service-oriented system 200 may be optimized over time to adapt to changing conditions.

Figure 3C:
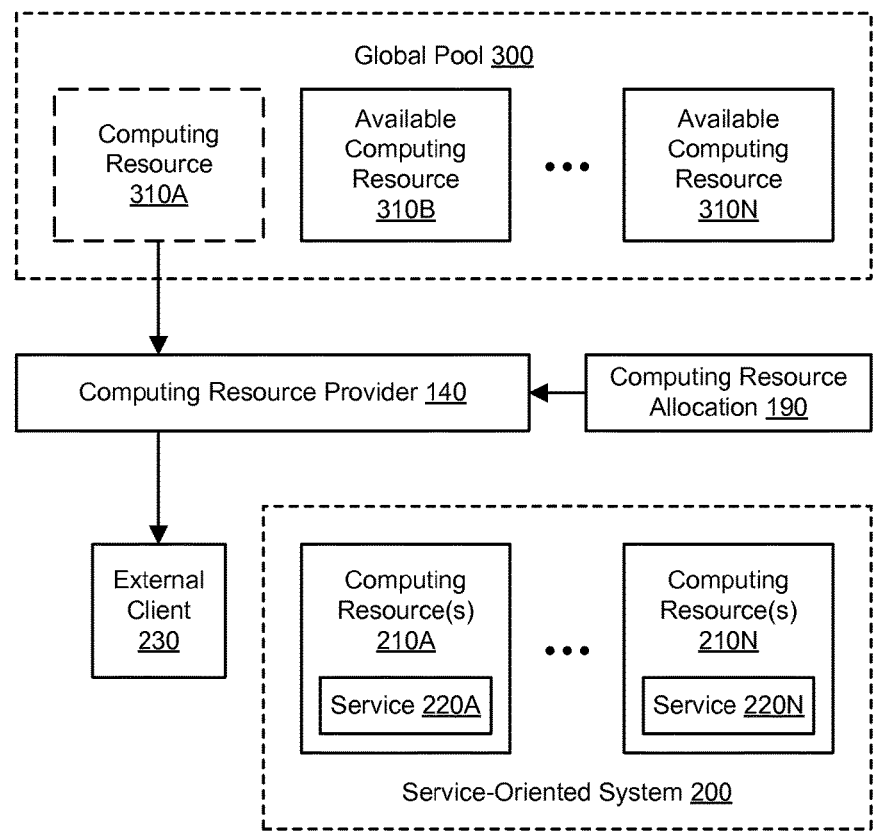
FIG. 3C illustrates further aspects of the example system environment for computing resource forecasting and optimization, including resource allocation from a global pool by an external client, according to some embodiments.

FIG. 3C illustrates further aspects of the example system environment for computing resource forecasting and optimization, including resource allocation from a global pool by an external client, according to some embodiments. A service-oriented system 200 may include a plurality of computing resources, such as resources 210A through 210N. Each set of computing resource(s) 210A-210N may provide or otherwise implement one or more services, such as service 220A provided by resource(s) 210A and service 220N provided by resource(s) 210N. As discussed above with respect to FIG. 3A and FIG. 3B, the services 220A-220N may use and return computing resources 310A-310N from the global pool 300, as needed. In one embodiment, the computing resources 310A-310N in the global pool 300 may also be allocated by an external client 230. The external client 230 may represent a system operated outside the service-oriented system 200 and/or a system operated by another entity than the entity that manages the global pool 300. Using a suitable interface to the computing resource provider 140, the external client 230 may allocate or otherwise reserve one of more the computing resources in the global pool 300, such as computing resource 310A. As with the service-oriented system 200, the external client may return the resource 310A to the global pool at any suitable point, e.g., when the reservation expires.

Figure 4:
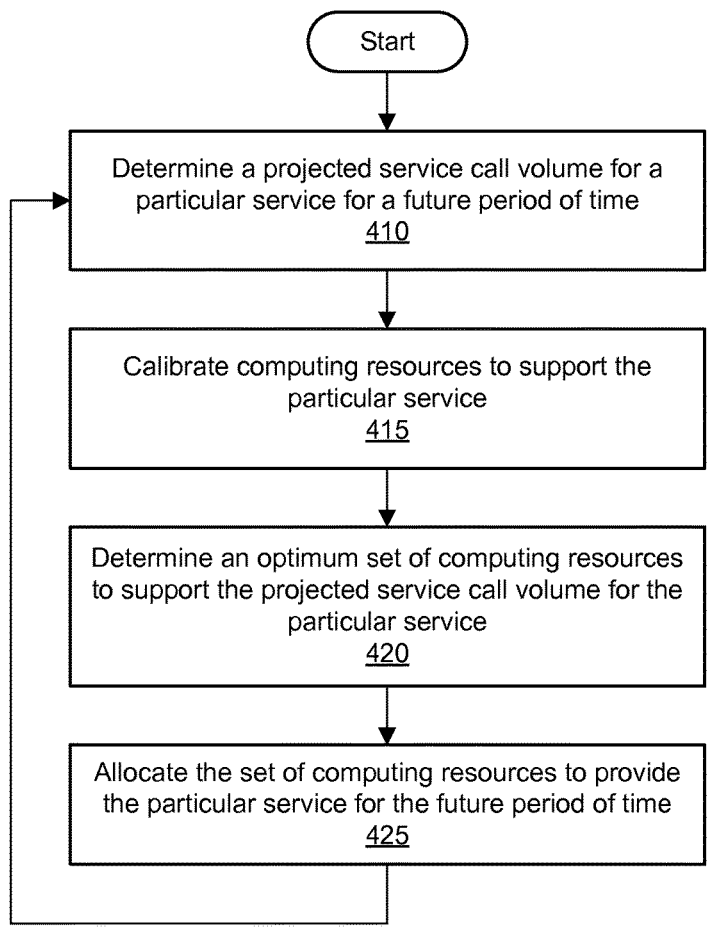
FIG. 4 is a flowchart illustrating a method for computing resource forecasting and optimization, according to some embodiments.

FIG. 4 is a flowchart illustrating a method for computing resource forecasting and optimization, according to some embodiments. As shown in 410, a projected service call volume may be determined for a particular service for a future period of time. The future period of time may represent a "lead time" necessary to allocate, acquire, provision, and/or configure computing resources, e.g., to provide a particular service. The future period of time may represent any suitable duration of time, e.g., from years to months to days to hours. The projected service call volume may be determined on any suitable basis.

In one embodiment, the projected service call volume may be determined based on a forecast for a demand drivers for the future period of time. The demand drivers may be determined on any suitable basis. In one embodiment, the demand drivers may be determined based on econometric models for business drivers, e.g., elements that drive aspects of a business or other organization. In one embodiment, the projected service call volume may be determined based on automated analysis of trace data for services in a service-oriented system. The automated analysis of the trace data may determine relationships between the particular service and individual demand drivers. In one embodiment, the projected service call volume may be determined based on a time-series analysis of service call volume history for the particular service.

As shown in 415, computing resources may be calibrated to support the particular service. The set of computing resources may include one or more hosts, storage resources, memory resources, network resources, power resources, and/or any other suitable types of resources. The computing resources may be calibrated for throughput for the particular service. The resources may be tested (e.g., using throughput testing) to calibrate them for a particular service.

As shown in 420, an optimum set of calibrated computing resources may be determined to support the projected service call volume for the particular service. Determining the set of computing resources may include determining a quantity and/or configuration for each of different types of resources or classes of resources that have been calibrated. The set of computing resources may be determined based on automated analysis of the projected service call volume. In one embodiment, a resource count (e.g., a host count for a set of calibrated hosts) may be determined based on a throughput metric, e.g., an efficiency index that indicates optimum throughput divided by a peak actual throughput for the particular service over a period of time. The efficiency index may be indicative of excess capacity, sufficient capacity, or insufficient capacity to support the projected service call volume for the particular service. For example, an efficiency index of less than 100% may indicate that a set of computing resources has insufficient capacity to support the projected service call volume, while an efficiency index of greater than 100% may indicate that a set of computing resources has excess capacity to support the projected service call volume.

As shown in 425, the optimum, calibrated set of computing resources may be allocated to provide or otherwise implement the particular service for the future period of time. In one embodiment, at least a portion of the set of computing resources may be allocated from a global pool of computing resources. The global pool may represent a plurality of computing resources which are available to various services in a service-oriented system, including the particular service. If the global pool is insufficient to fulfill the selected set of computing resources, then additional computing resources may be acquired, e.g., purchased or leased, in order to completely fulfill the selected set of computing resources.

Aspects of the operations shown in 410, 415, 420, and/or 425 may be performed continuously or many times for successive future time periods. For example, a new forecast for the demand drivers may be determined for a second period of time in the future, e.g., a period following the original period (and potentially overlapping the original period). Based on the new forecast for the demand drivers, a projected service call volume (i.e., a new projection) may be determined for the particular service for the future period of time. Computing resources may be calibrated again, and another optimum set of calibrated computing resources may be determined to support the newly projected service call volume for the particular service. The new set of computing resources may be allocated to support for the service for the second period of time. In one embodiment, additional computing resources may be allocated from the global pool or otherwise acquired to provide or implement the particular service for the second period of time. In one embodiment, if the second set of computing resources is smaller than the original set, then portions of the original set may be returned to the global pool and made available to other services. For example, if the second set contains fewer hosts than the first set, then the difference in hosts may be returned to the global pool. In this manner, the service-oriented system may be optimized over time to adapt to changing conditions.

Figure 5A:
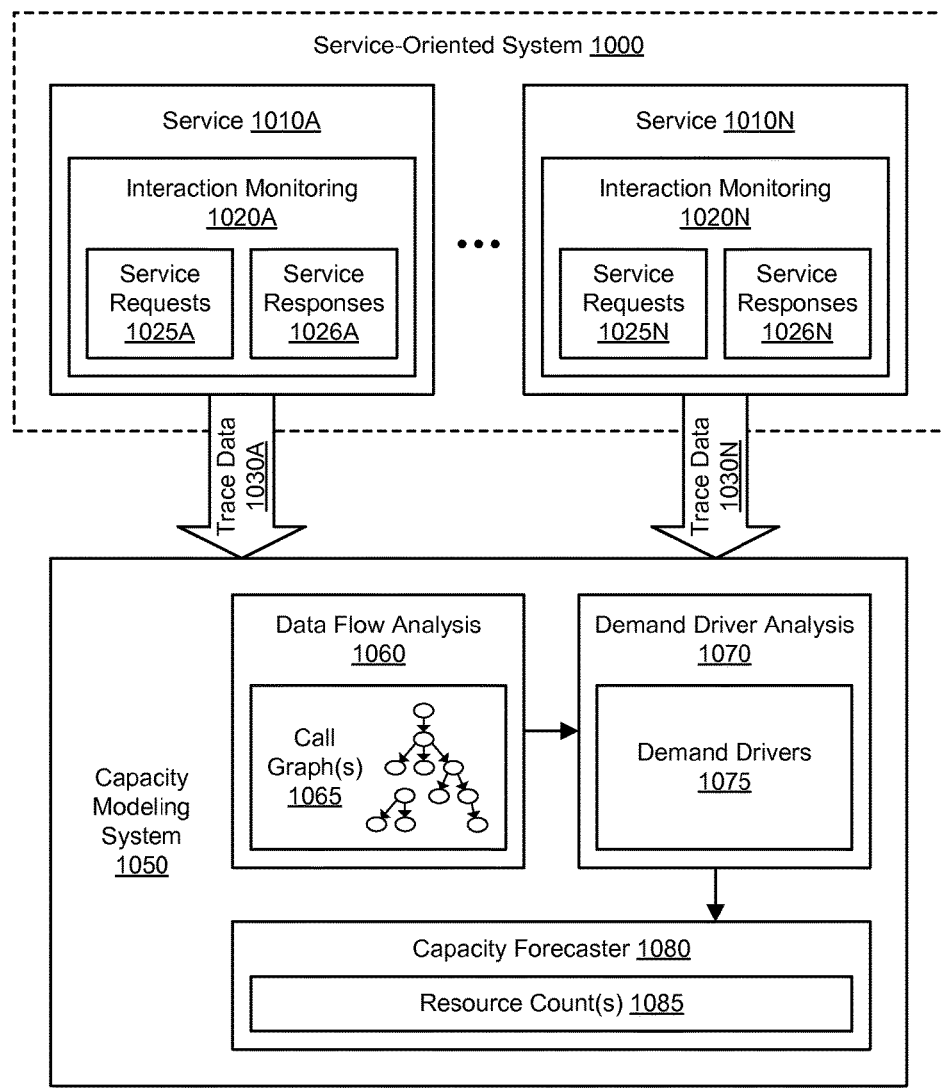
FIG. 5A illustrates an example system environment for automated services capacity modeling using call tracing, according to some embodiments.

FIG. 5A illustrates an example system environment for automated services capacity modeling using call tracing, according to some embodiments. The example system environment may include a service-oriented system 1000 and a capacity modeling system 1050. The service-oriented system 1000 may implement a service-oriented architecture and may include multiple services 1010A-1010N configured to communicate with each other (e.g., through message passing) to carry out various tasks, such as business functions. Although two services 1010A and 1010N are illustrated for purposes of example, it is contemplated that any suitable number of services may be used with the service-oriented system 1000. The services 1010A-1010N may represent different services (e.g., different sets of program code) or different instances of the same service. The services 1010A-1010N may be implemented using a plurality of hosts, any of which may be implemented by the example computing device 3000 illustrated in FIG. 16. The hosts may be located in any suitable number of data centers or geographical locations. In one embodiment, multiple services and/or instances of the same service may be implemented using the same host. It is contemplated that the service-oriented system 1000 and/or capacity modeling system 1050 may include additional components not shown, fewer components than shown, or different combinations, configurations, or quantities of the components shown.

Each service 1010A-1010N may be configured to perform one or more functions upon receiving a suitable request. For example, a service may be configured to retrieve input data from one or more storage locations and/or from a service request, transform or otherwise process the data, and generate output data. In some cases, a first service may call a second service, the second service may call a third service to satisfy the request from the first service, and so on. For example, to build a web page dynamically, numerous services may be invoked in a hierarchical manner to build various components of the web page. In some embodiments, services may be loosely coupled in order to minimize (or in some cases eliminate) interdependencies among services. This modularity may enable services to be reused in order to build various applications through a process referred to as orchestration. A service may include one or more components that may also participate in the service-oriented system, e.g., by passing messages to other services or to other components within the same service.

The service-oriented system 1000 may be configured to process requests from various internal or external systems, such as client computer systems or computer systems consuming networked-based services (e.g., web services). For instance, an end-user operating a web browser on a client computer system may submit a request for data (e.g., data associated with a product detail page, a shopping cart application, a checkout process, search queries, etc.). In another example, a computer system may submit a request for a web service (e.g., a data storage service, a data query, etc.). In general, services may be configured to perform any of a variety of business processes.

The services 1010A-1010N described herein may include but are not limited to one or more of network-based services (e.g., a web service), applications, functions, objects, methods (e.g., objected-oriented methods), subroutines, or any other set of computer-executable instructions. In various embodiments, such services may communicate through any of a variety of communication protocols, including but not limited to the Simple Object Access Protocol (SOAP). In various embodiments, messages passed between services may include but are not limited to Extensible Markup Language (XML) messages or messages of any other markup language or format. In various embodiments, descriptions of operations offered by one or more of the services may include Web Service Description Language (WSDL) documents, which may in some cases be provided by a service broker accessible to the services and components. References to services herein may include components within services.

In one embodiment, each of the services 1010A-1010N may be configured with one or more components for monitoring interactions between services. For example, service 1010A may include an interaction monitoring functionality 1020A, and service 1010N may include an interaction monitoring functionality 1020N. The interaction monitoring functionality 1020A or 1020N may monitor or track interactions between the corresponding service 1010A or 1010N and other services (or components of services) in the service-oriented system 1000. The monitored interactions may include service requests 1025A-1025N (i.e., requests for services to be performed), responses 1026A-1026N to requests, and other suitable events.

In one embodiment, the interaction monitoring functionality 1020A or 1020N may monitor service interactions such as service requests 1025A or 1025N and service responses 1026A or 1026N in any suitable environment, such as a production environment and/or a test environment. The production environment may be a "real-world" environment in which a set of production services are invoked, either directly or indirectly, by interactions with a real-world client, consumer, or customer, e.g., of an online merchant or provider of web-based services. In one embodiment, the test environment may be an environment in which a set of test services are invoked in order to test their functionality. The test environment may be isolated from real-world clients, consumers, or customers of an online merchant or provider of web-based services. In one embodiment, the test environment may be implemented by configuring suitable elements of computing hardware and software in a manner designed to mimic the functionality of the production environment. In one embodiment, the test environment may temporarily borrow resources from the production environment. In one embodiment, the test environment may be configured to shadow the production environment, such that individual test services represent shadow instances of corresponding production services. When the production environment is run in shadow mode, copies of requests generated by production services may be forwarded to shadow instances in the test environment to execute the same transactions.

To monitor the service requests 1025A-1025N and responses 1026A-1026N, lightweight instrumentation may be added to services, including services 1010A-1010N. The instrumentation (e.g., a reporting agent associated with each service) may collect and report data associated with each inbound request, outbound request, or other service interaction (e.g., a timer-based interaction) processed by a service. Further aspects of the interaction monitoring functionality 1020A-1020N are discussed below with respect to FIG. 10 through FIG. 15.

Based on the interaction monitoring, a service may collect trace data and send the trace data to the capacity modeling system 1050. For example, service 1010A may collect and send trace data 1030A, and service 1010N may collect and send trace data 1030N. The trace data may describe aspects of the service interactions. In one embodiment, the trace data may be generated in real-time or near real-time, e.g., as service requests and service responses are received and/or processed by the services. The trace data may include data indicative of relationships between individual services, such as an identification of the calling (i.e., requesting) service and the called (i.e., requested) service for each interaction. The trace data may include metadata such as request identifiers that are usable to identify paths of service requests and responses from service to service. Request identifiers are discussed in greater detail below with respect to FIG. 10 through FIG. 15. The trace data may also include data describing the performance of the service interactions. For example, the trace data may include data indicative of network latency for a request or response, data indicative of network throughput for one or more interactions, data indicative of service reliability or availability, data indicative of resource usage, etc. The trace data generated for multiple services and multiple service interactions may be sent to the capacity modeling system 1050 for aggregation and analysis.

In one embodiment, the capacity modeling system 1050 may include a plurality of components configured for tasks such as analysis of the trace data 1030A-1030N, capacity modeling for one or more services, and optimization of the service-oriented system 1000. For example, the capacity modeling system 1050 may include a data flow analysis functionality 1060, a demand driver analysis functionality 1070, and a capacity forecasting functionality 1080. The capacity modeling system 1050 may include one or more computing devices, any of which may be implemented by the example computing device 3000 illustrated in FIG. 16. In various embodiments, the functionality of the different services, components, and/or modules of the capacity modeling system 1050 may be provided by the same computing device or by different computing devices. If any of the various components are implemented using different computing devices, then the respective computing devices may be communicatively coupled, e.g., via a network. Each one of the data flow analysis functionality 1060, demand driver analysis functionality 1070, and capacity forecasting functionality 1080 may represent any combination of software and hardware usable to perform their respective functions, as discussed as follows.

The interaction monitoring functionality 1020A-1020N for the various services may collect data indicative of service interactions involved in satisfying a particular initial request, e.g., data indicative of a route taken in satisfying a service request and/or a hierarchy of call pathways between services. The route may correspond to a set of call paths between services. The call paths may represent inbound service requests and outbound service requests relative to a particular service. To process a given received request, one or more services may be invoked. As used herein, an initial request may be referred to as the "root request." In various embodiments, the root request may but need not originate from a computer system outside of the service-oriented system 1000. In many embodiments, a root request may be processed by an initial service, which may then call one or more other services. Additionally, each of those services may also call one or more other services, and so on until the root request is completely fulfilled. The particular services called to fulfill a request may be represented as a call graph that specifies, for each particular service of multiple services called to fulfill the same root request, the service that called the particular service and any services called by the particular service.

Using the data flow analysis functionality 1060, the capacity modeling system 1050 may analyze the trace data 1030A-1030N and generate one or more call graphs 1065 based on connectivity information within the trace data. Each call graph may represent the flow of requests from service to service and may identify service dependencies. Each call graph may include a plurality of nodes representing services and one or more edges (also referred to as call paths) representing service interactions. Each of the call graphs 1065 may include a hierarchical data structure that includes nodes representing the services and edges representing the interactions. In some cases, a call graph may be a deep and broad tree with multiple branches each representing a series of related service calls. The data flow analysis functionality 1060 may use any suitable data and metadata to build each call graph, such as request identifiers and metadata associated with services and their interactions. The request identifiers and metadata are discussed below with respect to FIG. 10 through FIG. 15. In one embodiment, the data flow analysis functionality 1060 may analyze the trace data 1030A-1030N and generate suitable reports and/or visualizations (e.g., call graph visualizations) based on the trace data 1030A-1030N.

The generation of a particular call graph may be initiated based on any suitable determination. In one embodiment, the call graph generation may be initiated after a sufficient period of time has elapsed with no further service interactions made for any relevant service. In one embodiment, heuristics or other suitable rule sets may be used to determine a timeout for a lack of activity to satisfy a particular root request. The timeout may vary based on the nature of the root request. For example, a root request to generate a web page using a hierarchy of services may be expected to be completed within seconds; accordingly, the call graph may be finalized within seconds or minutes.

Using the call graph(s) 1065 and/or other elements of the trace data 1030A-1030N, the capacity modeling system 1050 may determine a set of demand drivers that drive service calls to a particular service in the service-oriented system 1000. In one embodiment, the demand drivers may include terminal sources for service calls to the particular service, such as glance views and page visits, as well as other drivers such as an order volume in an online marketplace. In one embodiment, at least some of the demand drivers may correspond to applications and/or other entities (e.g., application programming interfaces) that drive service requests to the particular service. In one embodiment, the set of applications and/or other entities may include other services in the service-oriented system 1000. Using the demand driver analysis functionality 1070, the capacity modeling system 1050 may determine demand drivers 1075 for the particular service. In one embodiment, the demand drivers 1075 for a particular service may be based on the call graph(s) 1065 (or portions thereof) or other connectivity information; the call graph(s) or other connectivity information may indicate the relationship between particular terminal sources (e.g., other services) and the particular service that receives the service calls. Accordingly, the capacity modeling system 1050 may determine the relationship between a particular terminal source and a particular service to which the terminal source drives service calls.

The demand placed on a service by one or more of the demand drivers (e.g., as measured in the number of service calls or the computing resources used in responding to the service calls) may increase as the demand driver increases in magnitude. For example, a website checkout application may make multiple API (application programming interface) calls to a back-end ordering service for each customer checkout. In more complicated call graphs, a cascading sequence of calls through multiple service layers may ultimately be spawned by a particular demand driver.

Using the capacity forecaster 1080, the capacity modeling system 1050 may model the call volume to a service in the service-oriented system 1000. The model of the call volume to the service may be determined based on the demand drivers 1075, and thus based on the underlying trace data in one embodiment. The capacity forecaster 1080 may correlate a change in a particular demand driver to a change in call volume for a particular service. In one embodiment, based on the demand drivers 1075, the capacity forecaster 1080 may determine the total call volume to the particular service. In one embodiment, the capacity forecaster 1080 may determine the individual call volume from individual demand drivers and then determine the total call volume as a summation of the individual call volumes. The capacity forecaster 1080 may then determine a capacity forecast for the particular service based on the total call volume. In one embodiment, the capacity forecaster 1080 may recommend or otherwise determine one or more resource counts 1085 for one or more services, including the particular service, in the service-oriented system 1000. The resource count for a particular service may represent an optimized quantity of computing resources on which the particular service may be run or which may be used to provide the service. The resources may include hosts, storage resources, memory resources, network resources, power resources, and other suitable types of computing resources. The resources may be heterogeneous, and the capacity forecast may indicate different resource counts and/or configurations for different types of resources. In this manner, an appropriate resource count for a particular service may be determined in a manner that is automated, adaptive, and substantially deterministic.

In one embodiment, an appropriate entity (e.g., a user or an automated component) may acquire one or more additional computing devices to host a particular service based on a capacity forecast. In one embodiment, an appropriate entity (e.g., a user or an automated component) may increase or decrease the quantity of computing devices in an order (e.g., a purchase, lease or other acquisition) based on a capacity forecast. In one embodiment, an appropriate entity (e.g., a user or an automated component) may increase or decrease the quantity of computing devices currently deployed in the service-oriented system 1000 based on a capacity forecast. In one embodiment, a capacity forecast may cause reconfiguration of the service-oriented system 1000 (e.g., by changing the number of hosts throughout the system or the number of hosts provisioned to a run a particular service) in the future, e.g., some days or months away. In one embodiment, a capacity forecast may cause reconfiguration of the service-oriented system 1000 (e.g., by changing the number of hosts throughout the system or the number of hosts provisioned to a run a particular service) in the present or near future, e.g., some minutes or hours away. In general, based on a capacity forecast, an appropriate entity (e.g., a user or an automated component) may cause reconfiguration and/or a change in quantity of one or more computing resources such as hosts, storage resources, memory resources, network resources, and/or power resources.

In one embodiment, aspects of the capacity modeling system 1050 may be performed automatically and/or programmatically, e.g., by executing program instructions without direct user intervention to determine the call graph(s), demand drivers 1075, individual call volumes for individual demand drivers, total call volume(s), and/or resource count(s) 1085. In one embodiment, aspects of the capacity modeling system 1050 may be performed continuously and/or repeatedly to adapt to changing conditions in the service-oriented system 1000. For example, the capacity forecast (including a resource count) for a particular service may be kept up to date based on the latest trace data, e.g., by revising the capacity forecast periodically. In this manner, the capacity forecast may be updated to capture the effects of demand changes in the service-oriented system 1000. As another example, the capacity forecast (including a resource count) for a particular service may be updated when the program code for the service is updated. In one embodiment, the capacity modeling system 1050 may be included in a deployment pipeline for new software (including new versions of software) such that a capacity forecast is determined based on the latest version of the program code. In one embodiment, automated calibration for hosts may also be included in the deployment pipeline. The frequency of host calibration (e.g., recalibration) may affect the accuracy of the capacity model. Additionally, the sampling rate of trace data may affect the accuracy of the capacity model.

In one embodiment, all or nearly all of the service interactions (e.g., the service requests 1025A-1025N and service responses 1026A-1026N) may be monitored to generate trace data 1030A-1030N for use with the capacity modeling system 1050. In one embodiment, however, only a subset of the service interactions (e.g., service requests 1025A-1025N and service responses 1026A-1026N) may be monitored to generate trace data 1030A-1030N for use with the capacity modeling system 1050. Any suitable technique may be used to identify which of the service interactions are collected and/or used as the basis for the resource count(s) 1085. For example, probabilistic sampling techniques may be used to initiate interaction monitoring for a certain percentage (e.g., 1%) of all service interactions. In one embodiment, the capacity modeling system 1050 may receive a continuous stream of trace data from the service-oriented system 1000. The capacity modeling system 1050 may generate and/or modify the resource count(s) 1085 repeatedly and at appropriate intervals.

In one embodiment, the capacity modeling system 1050 may analyze the performance data generated by the interaction monitoring functionality 1020A-1020N and received by the capacity modeling system 1050 in the trace data 1030A-1030N. The capacity modeling system 1050 may determine one or more performance metrics based on the trace data 1030A-1030N. In one embodiment, the performance metrics may describe aspects of the performance of multiple interactions, such as metrics representing aggregate performance, average performances, etc. In one embodiment, the performance metrics may describe aspects of the performance of individual interactions. For example, the capacity modeling system 1050 may calculate the client-measured latency for an interaction based on the time at which a request was sent by a service and also on the time at which a response to the request was received by the service. The capacity modeling system 1050 may also calculate the server-measured latency for an interaction based on the time at which a request was received by a service and also on the time at which a response to the request was sent by the service. The network transit time for the interaction may be calculated as the difference between the client-measured latency and the server-measured latency. Accordingly, the performance metrics may include individual transit times for individual service calls and/or transit time metrics (e.g., mean, median, etc.) for multiple service calls. Network transit times may be impacted by the number of network hops, the physical distance between hops, and the link quality between endpoints. In one embodiment, the performance metrics may describe aspects of the costs of performing or maintaining various interactions, services, instances of services, and/or hosts. For example, the cost may include elements of computing resource usage (e.g., processor usage, persistent storage usage, memory usage, etc.), energy consumption, heat production, and/or any other suitable cost element(s).

In one embodiment, the resource count(s) 1085 may be determined as part of an optimized configuration for the service-oriented system 1000. As used herein, the term "optimized" generally means "improved" rather than "optimal." The optimized configuration for a set of services may represent an improvement on the existing configuration of the set of services with respect to one or more performance metrics (e.g., network latency or transit times, throughput, reliability or availability, cost, etc.) for at least a portion of the one or more call graphs. Accordingly, the optimized configuration may be determined based on the one or more performance metrics in order to optimize one or more call paths of the one or more call graphs 1065. In one embodiment, the optimized configuration may also be determined based on additional information that is not derived from trace data, such as an expense associated with each service instance, service interaction, host, and/or unit of resource consumption. In one embodiment, the optimized configuration may be determined such that it minimizes, maximizes, decreases, or increases a total performance metric for one or more call paths. For example, the optimized configuration may minimize or reduce the network latency for one or more call paths, maximize or increase the throughput for one or more call paths, maximize or increase the reliability or availability for one or more call paths, or minimize or reduce the cost for one or more call paths. Any suitable component(s) may be used to implement the optimizer. For example, the optimizer may be implemented using a constrained optimization solver which is configured to minimize a cost function or an energy function in the presence of one or more constraints or to maximize a reward function or a utility function in the presence of one or more constraints. The optimizer may generate an optimized configuration by optimizing a user-defined function of network latency, throughput, reliability, cost, and/or any other suitable term(s).

Figure 5B:
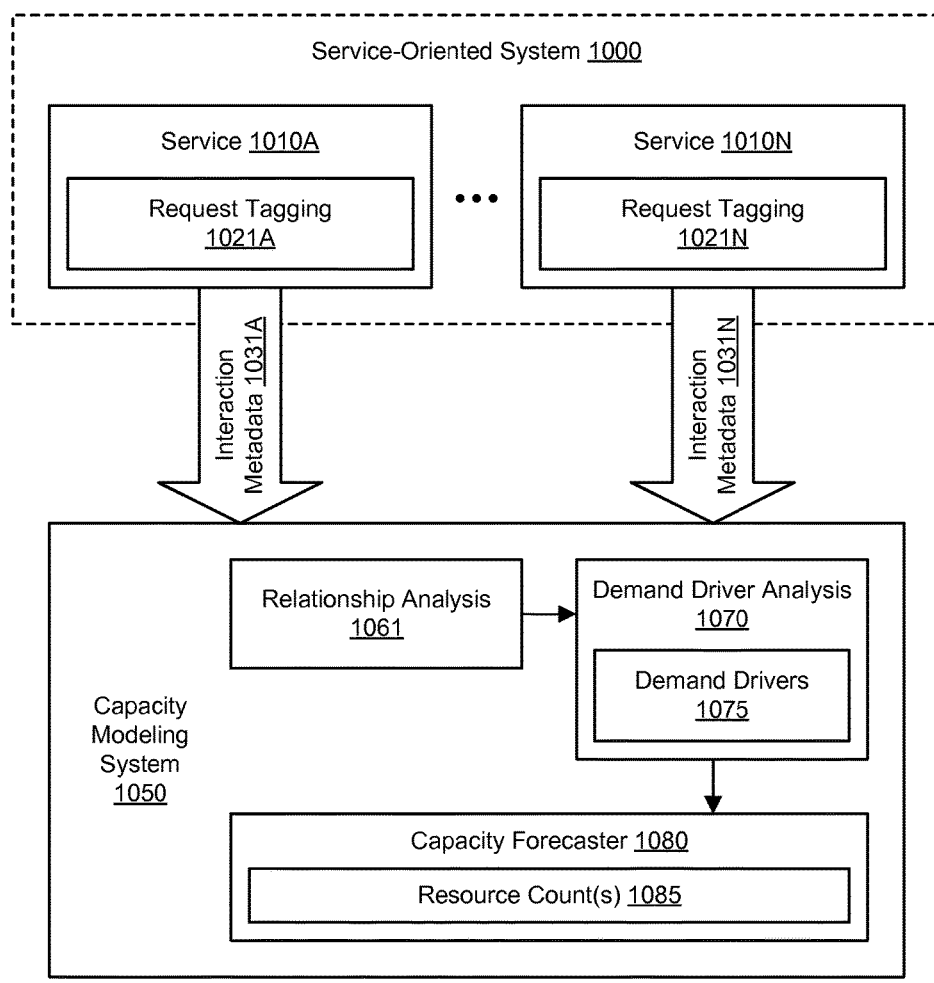
FIG. 5B illustrates an example system environment for automated services capacity modeling using request tagging, according to some embodiments.

FIG. 5B illustrates an example system environment for automated services capacity modeling using request tagging, according to some embodiments. In one embodiment, the demand drivers 1075 may be determined based on information other than trace data 1030A-1030N. As shown in the example of FIG. 5B, for example, the demand drivers may be based on tags or other metadata associated with service requests. The tags or other metadata may indicate the demand driver for each service call, such as the terminal source of the call (e.g., another service).

In one embodiment, each of the services 1010A-1010N may be configured with one or more components for tagging interactions between services, such as requests to services. For example, service 1010A may include a request tagging functionality 1021A, and service 1010N may include a request tagging functionality 1021N. The request tagging functionality 1021A or 1021N may tag service requests initiated by the corresponding service 1010A or 1010N. The tag or other metadata may be added to communications at any suitable layer, e.g., a higher layer such as the application layer or a lower layer such as the IP layer. For a particular service call, the tag or other metadata may be added by the terminal source of the service call and may identify the terminal source. The tag or other metadata may be passed as part of the request to the service whose functionality is invoked, potentially through one or more intermediate services.

The recipient services may send interaction metadata 1031A and 1031N including the tags or other metadata to the capacity modeling system 1050. Using a relationship analysis functionality 1061, the capacity modeling system 1050 may determine the relationships between terminal sources and the services they invoke, e.g., based on the interaction metadata 1031A and 1031N. The demand drivers 1075 for a particular service may then be determined based on the relationship analysis 1061.

Figure 6:
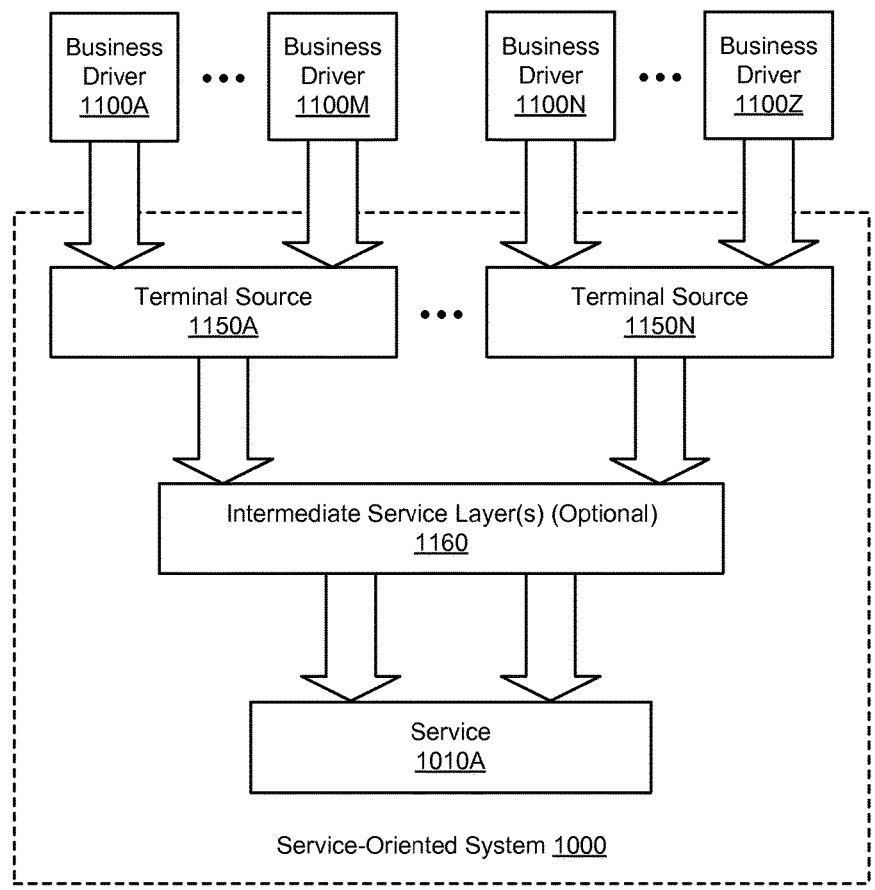
FIG. 6 illustrates relationships between various entities that influence the capacity modeling for a particular service.
Figure 7:
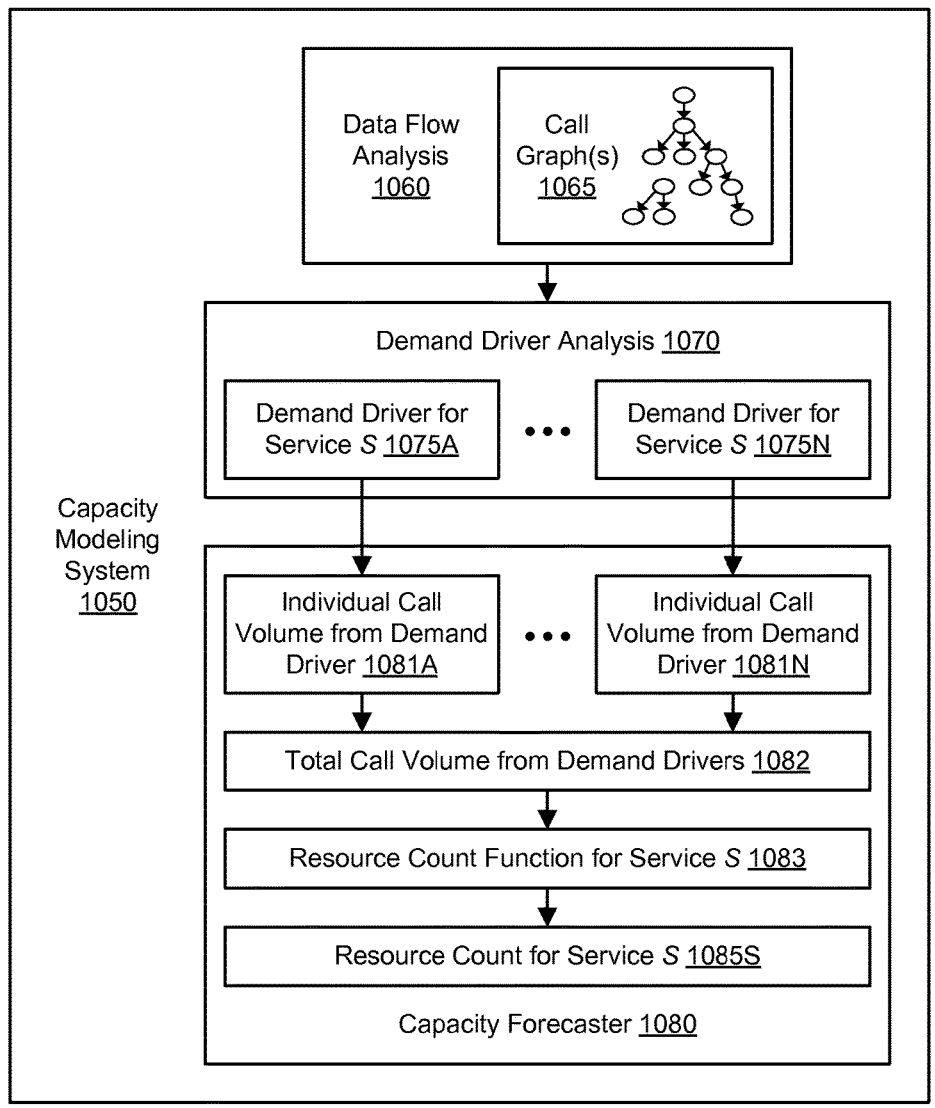
FIG. 7 illustrates further aspects of the example system environment for automated services capacity modeling, including call volume determination, according to some embodiments.

FIG. 6 illustrates relationships between various entities that influence the capacity modeling for a particular service. As discussed above, a plurality of terminal sources, such as terminal sources 1150A through 1150N, may drive call volume to a particular service, such as service 1010A. The terminal sources may correspond to other services within the service-oriented system 1000 and may therefore be referred to as end-user applications or application drivers. Similarly, a plurality of business drivers may cause engagement (e.g., on behalf of users) with the terminal sources 1150A-1150N. The business drivers may represent entities or quantifiable elements external to the service-oriented system 1000. For example, if the service-oriented system 1000 represents an online marketplace, then the business drivers may represent referrals to that online marketplace from other websites or entities. As shown in the example of FIG. 6, a plurality of business drivers 1100A through 1100M may drive engagement with terminal source 1150A, and a plurality of business drivers 1100N through 1100Z may drive engagement with terminal source 1150N. The business drivers for different terminal sources may overlap, such that one or more of the business drivers 1100A through 1100M may also be part of the business drivers 1100N through 1100Z. In one embodiment, the business drivers 1100A-1100Z may be modeled using any suitable technique(s). The path between any of the terminal sources 1150A-1150N and the service 1010A may optionally include one or more intermediate service layers 1160. The intermediate service layer(s) 1160 may include one or more services in the service-oriented system 1000. The intermediate service layer(s) 1160 may be arranged in any suitable number of layers, such that requests from a terminal source may cascade from service to service through one or more layers of intermediate services before reaching the service 1010A. The techniques described herein may be used for modeling the service 1010A, any of the services in the intermediate service layer(s) 1160, and any services represented by the terminal sources 1150A-1150N.

FIG. 7 illustrates further aspects of the example system environment for automated services capacity modeling, including call volume determination, according to some embodiments. As discussed above, the capacity modeling system 1050 may generate one or more call graphs 1065 based on trace data for a service-oriented system 1000. The call graph(s) may indicate that a set of demand drivers cause the functionality of a particular service S to be invoked. Using the demand driver analysis functionality 1070, the capacity modeling system 1050 may determine demand drivers 1075 for the particular service S, including demand driver 1075A through demand driver 1075N.

The capacity forecaster 1080 may then determine a call volume to the service S from each of the demand drivers 1075A through 1075N, including an individual call volume 1081A for demand driver 1075A and an individual call volume 1081N for demand driver 1075N. In one embodiment, for each demand driver i, the capacity forecaster 1080 may determine the call volume $CV_i$ to the service S from the demand driver i as a function of the one or more (e.g., 1 through m) business drivers BDi for the demand driver i:

$$CV_i = f_i(BD_{i1}, BD_{i2}, \ldots BD_{im})$$

Based on the individual call volumes, the capacity forecaster 1080 may determine the total call volume 182 for the service S from the applications A through N. In one embodiment, the capacity forecaster 1080 may determine the total call volume CV for the service S as a summation of the individual call volumes $CV_i$:

$$CV = \Sigma CV_i = \Sigma f_i(BD_{i1}, BD_{i2}, \ldots BD_{im})$$

The capacity forecaster 1080 may apply a resource count function 1083 for the service S to produce a resource count 1085S for the service S. The resource count function 1083 for the service S may be represented as a function of the total call volume CV:

$$ResourceCount = f(CV)$$

The resulting ResourceCount value may represent a capacity forecast for the service S in terms of a total quantity of computing resources to provide the service S. The total quantity may include constituent quantities of various types or configurations of computing resources, such as different types or configurations of computing devices, different types or configurations of storage resources, different types or configurations of memory resources, and other suitable resources. The resource count function 1083 may be a function of the service S. In one embodiment, the resource count function 1083 may include the total call volume CV divided by the calibrated optimal volume per host. The resource count function 1083 may be pre-calibrated for the particular service S, and the resource count function 1083 may be kept up-to-date and consistent with any changes to the program code of the service S.

In one embodiment, the optimal volume per host may be determined using any suitable techniques. For example, optimal volume per host may be determined using a predicted hardware cost metric. The predicted hardware cost metric may be generated based on any suitable data, such as hardware cost metric data (representing a cost associated with the performance of the hardware) and/or prediction data (representing a predicted quantity of transactions to be processed by the hardware). The hardware cost metric data may be generated based on throughput data (representing quantities of processed transactions over a period of time), peak data (representing a peak quantity of processed transactions over a period of time), and/or expense data (representing an expense associated with the hardware, e.g., the total cost of ownership).

Figure 8A:
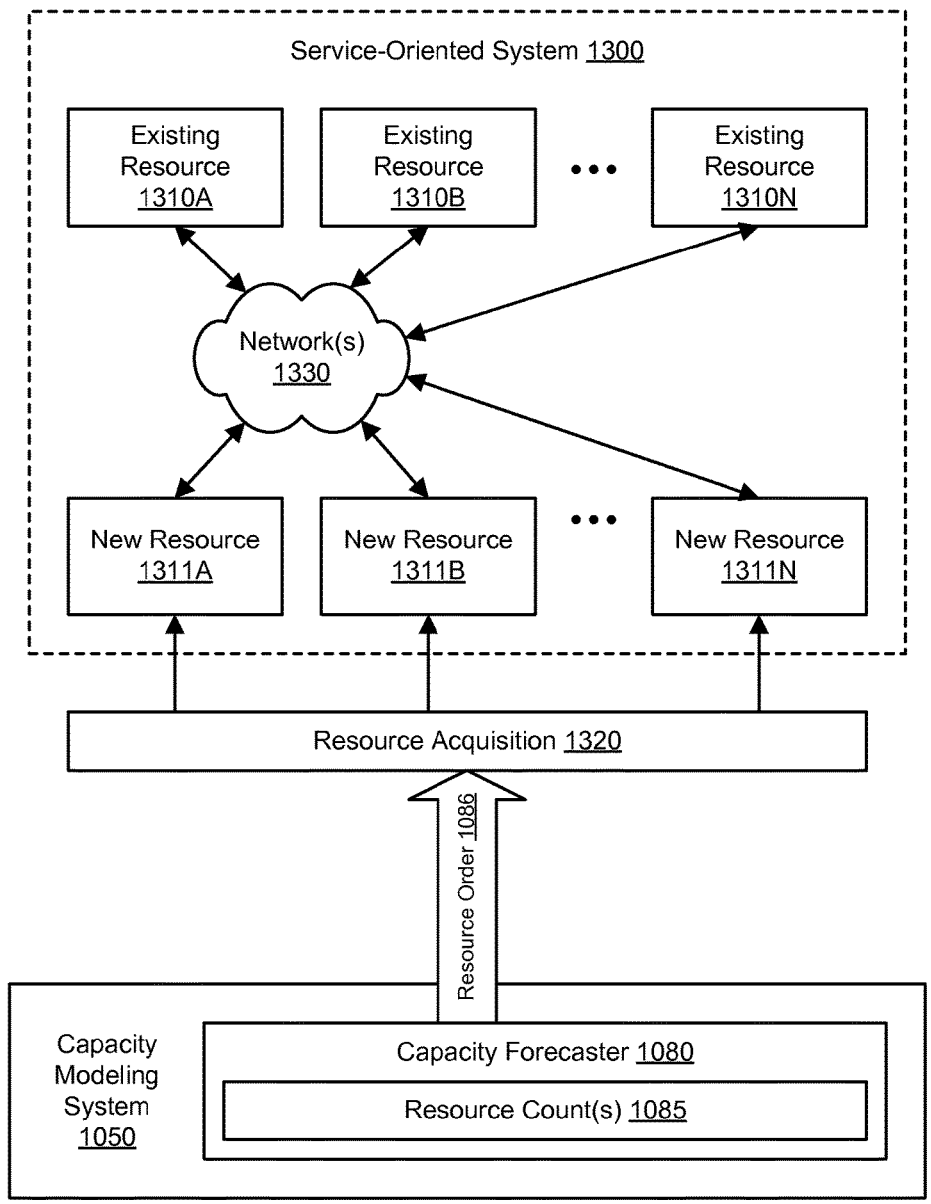
FIG. 8A illustrates further aspects of the example system environment for automated services capacity modeling, including resource acquisition, according to some embodiments.

FIG. 8A illustrates further aspects of the example system environment for automated services capacity modeling using call tracing, including resource acquisition, according to some embodiments. A service-oriented system 1300 may implement a service-oriented architecture and may include a plurality of resources. For example, the resources may include various types or configurations of hosts, any of which may be implemented by the example computing device 3000 illustrated in FIG. 16, as well as various types or configurations of memory resources, storage resources, network resources, power resources, and/or other suitable types of resources. The resources may be coupled using one or more networks 1330. Although various resources (e.g., resources 1310A, 1310B, 1310N, 1311A, 1311B, and 1311N) are illustrated for purposes of example, it is contemplated that any suitable number, type, or configuration of resources may be used with the service-oriented system 1300. The resources 1310A-1310N and 1311A-1311N may be located in any suitable number of data centers and/or geographical locations. Each resources may support one or more services, e.g., any of services 1010A-1010N. In one embodiment, multiple services and/or instances of the same service may be implemented using the same resource. It is contemplated that the service-oriented system 1300 and/or capacity modeling system 1050 may include additional components not shown, fewer components than shown, or different combinations, configurations, or quantities of the components shown.

In some embodiments, any of the resources 1310A-1310N and 1311A-1311N may represent hosts that are implemented as virtual compute instances or as physical compute instances. The virtual compute instances and/or physical compute instances may be offered to clients, provisioned, and maintained by a provider network that manages computational resources, memory resources, storage resources, and network resources. A virtual compute instance may comprise one or more servers with a specified computational capacity (which may be specified by indicating the type and number of CPUs, the main memory size, and so on) and a specified software stack (e.g., a particular version of an operating system, which may in turn run on top of a hypervisor). One or more virtual compute instances may be implemented by the example computing device 3000 illustrated in FIG. 16.

In one embodiment, individual resources may be added to or subtracted from the service-oriented system 1300, e.g., based on the resource count(s) 1085 generated by the capacity forecaster 1080. For example, the capacity modeling system 1050 may generate a resource order 1086 that recommends or instructs an appropriate entity to acquire one or more additional resources, e.g., to run one or more particular services whose call volumes were modeled by the capacity modeling system. As shown in the example of FIG. 8A, the resource count(s) 1085 may represent an increase in resources, e.g., by adding a quantity of new resources 1311A-1311N to a set of existing resources 1310A-1310N. However, it is contemplated that the resource count(s) 1085 may also represent a decrease in resources, such that the capacity forecaster 1080 recommends that one or more resources be removed from the service-oriented system for one or more services.

In one embodiment, a resource acquisition component 1320 may acquire the new resources 1311A-1311N to meet the resource order 1086. The resource acquisition component 1320 may represent an administrator of the service-oriented system 1300 and/or an automated component. In one embodiment, the resource acquisition component 1320 may acquire the new resources 1311A-1311N by purchasing or leasing the new resources 1311A-1311N. In one embodiment, the resource acquisition component 1320 may acquire the new resources 1311A-1311N by provisioning the new resources from a pool of available compute instances. New hosts may be provisioned, for example, by selecting available compute instances with suitable specifications and configuring the selected compute instances with suitable software. Additionally, a suitable component of the service-oriented system 1300 may provision and/or configure the new resources 1311A-1311N to provide the service(s) for which the resources were acquired to run.

Figure 8B:
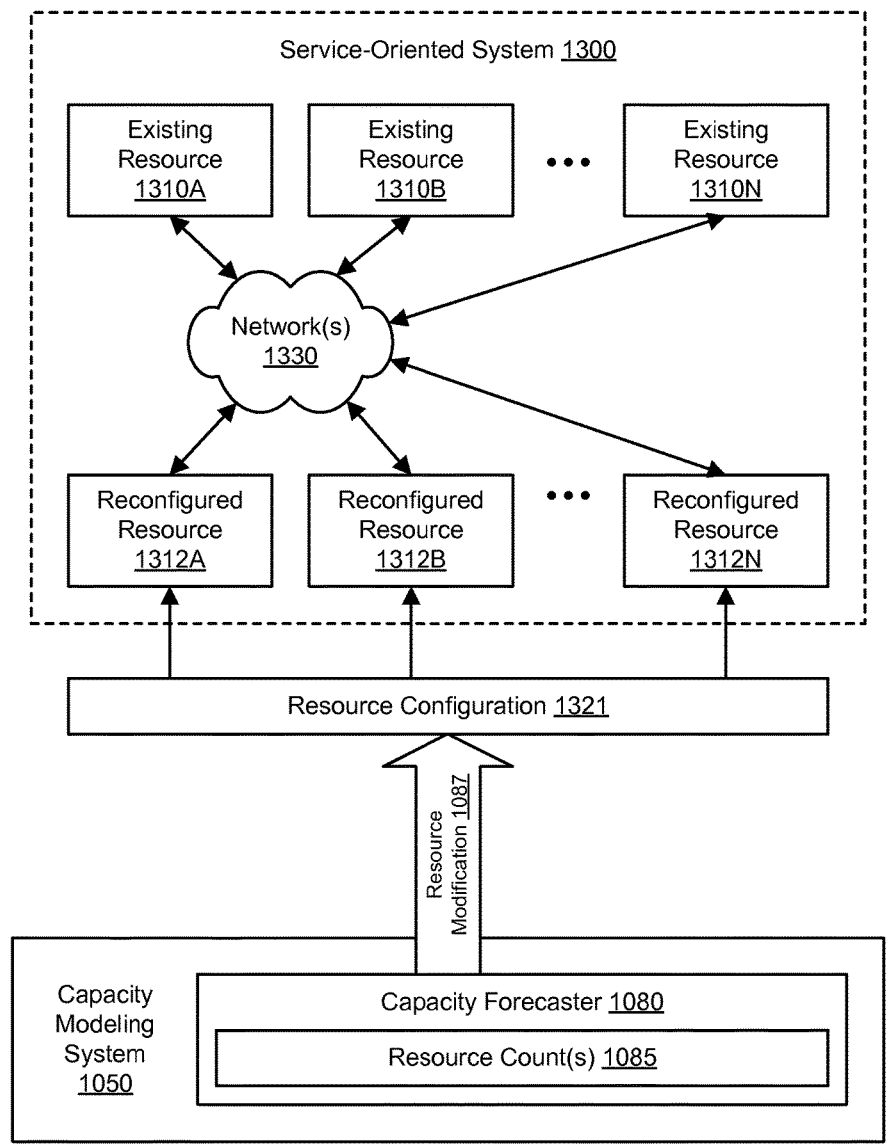
FIG. 8B illustrates further aspects of the example system environment for automated services capacity modeling, including resource configuration, according to some embodiments.

FIG. 8B illustrates further aspects of the example system environment for automated services capacity modeling, including resource configuration, according to some embodiments. In one embodiment, individual resources may be reconfigured, e.g., based on the resource count(s) 1085 generated by the capacity forecaster 1080. For example, the capacity modeling system 1050 may generate a resource modification plan 1087 that recommends or instructs an appropriate entity to modify the configuration of one or more resources, e.g., to run one or more particular services whose call volumes were modeled by the capacity modeling system. In one embodiment, a resource configuration component 1321 may modify the configuration of the resources 1312A-1312N to meet the resource modification plan 1087. The resource configuration component 1321 may represent an administrator of the service-oriented system 1300 and/or an automated component. The configurations may be modified uniformly or non-uniformly, depending on the resource modification plan 1087.

Figure 9:
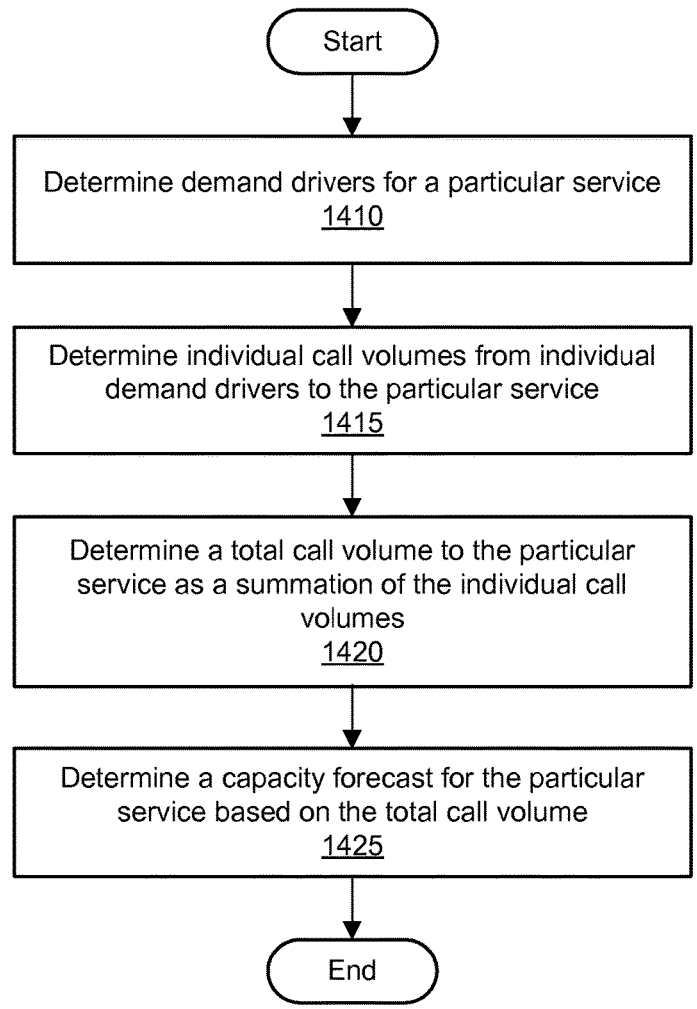
FIG. 9 is a flowchart illustrating a method for automated services capacity modeling, according to some embodiments.

FIG. 9 is a flowchart illustrating a method for automated services capacity modeling using call tracing, according to some embodiments. In one embodiment, trace data may be received by a capacity modeling system. The trace data may be generated for a plurality of service interactions between individual ones of a plurality of services in a service-oriented system, e.g., by instrumentation of the services. The trace data may include data indicative of call paths between the individual services. In one embodiment, based on the trace data, the capacity modeling system may perform one or more automated steps to generate a capacity model for a particular service, as indicated below.

As shown in 1410, a plurality of demand drivers may be determined for a particular service. In one embodiment, the demand drivers may be determined based on the trace data or other metadata. The demand drivers may be determined to drive the generation of service calls to the particular service.

As shown in 1415, a respective call volume (e.g., to the particular service) may be determined from each of the demand drivers that drives the particular service. As shown in 1420, a total call volume may be determined for the plurality of demand drivers. The total call volume may be determined as a summation of the respective call volumes for the individual demand drivers.

As shown in 1425, a capacity forecast may be determined for the particular service. The capacity forecast may be determined based on the total call volume for the plurality of demand drivers that drive the particular service. The capacity forecast may be updated any suitable number of times, e.g., based on additional trace data representing a more recent state of the service-oriented system. The capacity forecast may recommend or otherwise indicate an optimized quantity of computing resources to host the particular service. In one embodiment, the optimized quantity may be determined based on a resource count function for the particular service. In one embodiment, the resource count function for the particular service may include the total call volume divided by a calibrated optimal volume per computing resource. The resource count function for the particular service may be updated in response to a modification of program code for the particular service.

Based on the capacity forecast, one or more additional computing devices or other resources may be ordered (e.g., purchased, leased, or otherwise acquired) to host or otherwise support the particular service. In one embodiment, a quantity of computing resources to be acquired in an existing order may be increased based on the optimized quantity. In one embodiment, a quantity of computing resources to be acquired in an existing order may be decreased based on the optimized quantity.

Tracking Service Requests

For clarity of description, various terms may be useful for describing elements of a call graph. Note that the following terminology may only be applicable to services and requests of a given call graph. In other words, the following terminology may only be applicable for services and requests associated with the same root request. From the perspective of a particular service, any service that calls the particular service may be referred to as a "parent service." Furthermore, from the perspective of a particular service, any service that the particular service calls may be referred to as a "child service." In a similar fashion, from the perspective of a particular request, any request from which the particular request stems may be referred to as a "parent request." Furthermore, from the perspective of a particular request, any request stemming from the particular request may be referred to as a "child request." Additionally, as used herein the phrases "request," "call," "service request" and "service call" may be used interchangeably. Note that this terminology refers to the nature of the propagation of a particular request throughout the present system and is not intended to limit the physical configuration of the services. As may sometimes be the case with service-oriented architectures employing modularity, each service may in some embodiments be independent of other services in the service-oriented system (e.g., the source code of services or their underlying components may be configured such that interdependencies among source and/or machine code are not present).

As described above, a given parent request may result in multiple child service calls to other services. In various embodiments of the system and method for tracking service requests, request identifiers embedded within such service calls (or located elsewhere) may be utilized to generate a stored representation of a call graph for a given request. In various embodiments, such request identifiers may be stored in log files associated with various services. For instance, a service may store identifiers for inbound requests in an inbound request log and/or store identifiers for outbound requests in an outbound request log. In various embodiments, call graph generation logic may generate a representation of a call graph from identifiers retrieved from such logs. Such representations may be utilized for diagnosing errors with request handling, providing developer support, and performing traffic analysis.

Figure 10:
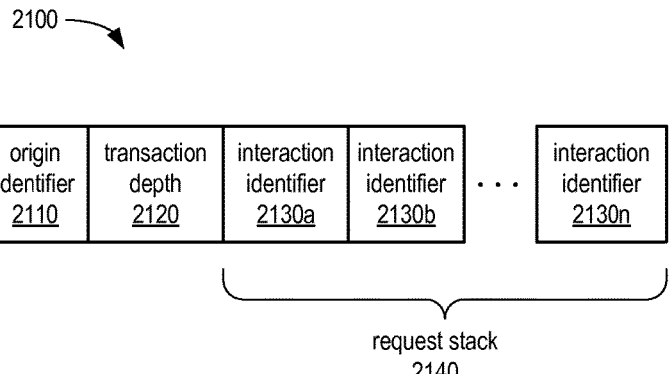
FIG. 10 illustrates an example format of a request identifier, according to some embodiments.

FIG. 10 illustrates an example format for a request identifier 2100 of various embodiments. As described in more detail below, request identifiers of the illustrated format may be passed along with service requests. For instance, a service that calls another service may embed in the call an identifier formatted according to the format illustrated by FIG. 10. For example, a requesting service may embed a request identifier within metadata of a request. In various embodiments, embedding a request identifier in a service request may include embedding within the service request, information that specifies where the request identifier is located (e.g., a pointer or memory address of a location in memory where the request identifier is stored). The various components of the illustrated request identifier format are described in more detail below.

An origin identifier (ID) 2110 may be an identifier assigned to all requests of a given call graph, which includes the initial root request as well as subsequent requests spawned as a result of the initial root request. For example, as described above, the service-oriented systems of various embodiments may be configured to process requests from various internal or external systems, such as client computer systems or computer systems consuming networked-based services. To fulfill one of such requests, the service-oriented system may call multiple different services. For instance, service "A" may be the initial service called to fulfill a request (e.g., service "A" may be called by an external system). To fulfill the initial request, service "A" may call service "B," which may call service "C," and so on. Each of such services may perform a particular function or quantum of work in order to fulfill the initial request. In various embodiments, each of such services may be configured to embed the same origin identifier 2110 into a request of (or call to) another service. Accordingly, each of such requests may be associated with each other by virtue of containing the same origin identifier. As described in more detail below, the call graph generation logic of various embodiments may be configured to determine that request identifiers having the same origin identifier are members of the same call graph.

The manner in which the origin identifier may be represented may vary according to various embodiments and implementations. One particular example of an origin identifier may include a hexadecimal string representation of a standard Universally Unique Identifier (UUID) as defined in Request for Comments (RFC) 4122 published by the Internet Engineering Task Force (IETF). In one particular embodiment, the origin identifier may contain only lowercase alphabetic characters in order to enable fast case-sensitive comparison of request identifiers (e.g., a comparison performed by the call graph generation logic described below). Note that these particular examples are not intended to limit the implementation of the origin ID. In various embodiments, the origin ID may be generated according to other formats.

Transaction depth 2120 may indicate the depth of a current request within the call graph. For instance (as described above), service "A" may be the initial service called to fulfill a root request (e.g., service "A" may be called by an external system). To fulfill the initial request, service "A" may call service "B," which may call service "C," and so on. In various embodiments, the depth of the initial request may be set to 0. For instance, when the first service or "root" service receives the root service request, the root service (e.g., service "A") may set the transaction depth 120 to 0. If in response to this request the originating service calls one or more other services, the transaction depth for these requests may be incremented by 1. For instance, if service "A" were to call two other services "B1" and "B2," the transaction depth of the request identifiers passed to such services would be equivalent to 1. The transaction depth for request identifiers of corresponding requests sent by B1 and B2 would be incremented to 2 and so on. In the context of a call graph, the transaction depth of a particular request may in various embodiments represent the distance (e.g., number of requests) between that request and the root request. For example, the depth of the root request may be 0, the depth of a request stemming from the root request may be 1, and so on. Note that in various embodiments, such numbering system may be somewhat arbitrary and open to modification.

The manner in which the origin identifier may be represented may vary according to various embodiments and implementations. One particular example of a transaction depth may be represented as a variable-width base-64 number. In various embodiments, the value of a given transaction depth may be but need not be a value equivalent to the increment of the previous transaction depth. For instance, in some embodiments, each transaction depth may be assigned a unique identifier, which may be included in the request identifier instead of the illustrated transaction depth 2120.

Interaction identifiers 2130a-2130n, collectively referred to as interaction identifier(s) 2130, may each identify a single request (or service call) for a given call graph. For instance (as described above), service "A" may be the initial service called to fulfill a request (e.g., service "A" may be called by an external system). To fulfill the root request, service "A" may call service "B," which may call service "C," and so on. In one example, the call of service "B" by service "A" may be identified by interaction identifier 2130a, the call of service "C" by service "B" may be identified by interaction identifier 2130b and so on.

Note that in various embodiments separate service requests between the same services may have separate and unique interaction identifiers. For example, if service "A" calls service "B" three times, each of such calls may be assigned a different interaction identifier. In various embodiments, this characteristic may ensure that the associated request identifiers are also unique across service requests between the same services (since the request identifiers include the interactions identifiers).

Note that in various embodiments the interaction identifier may be but need not be globally unique (e.g., unique with respect to all other interaction identifiers). For instance, in some embodiments, a given interaction identifier for a given request need be unique only with respect to request identifiers having a particular origin identifier 2110 and/or a particular parent interaction identifier, which may be the interaction identifier of the request preceding the given request in the call graph (i.e., the interaction identifier of the request identifier of the parent service). In one example, if service "A" were to call two other services "B1" and "B2," the request identifier of service "B1" and the request identifier of service "B2" would have separate interaction identifiers. Moreover, the parent interaction identifier of each of such interaction identifiers may be the interaction identifier of the request identifier associated with the call of service "A." The relationship between interaction identifiers and parent interaction identifiers is described in more detail below.

In various embodiments, interaction identifiers may be generated randomly or pseudo-randomly. In some cases, the values generated for an interaction identifier may have a high probability of uniqueness within the context of parent interaction and/or a given transaction depth. In some embodiments, the size of the random numbers that need to be generated depends on the number of requests a service makes.

Request stack 2140 may include one or more of the interaction identifiers described above. In various embodiments, the request stack may include the interaction identifier of the request to which the request identifier belongs. In some embodiments, the request stack may also include other interaction identifiers, such as one or more parent interaction identifiers of prior requests (e.g., a "stack" or "history" of previous interaction identifiers in the call graph). In various embodiments, the request stack may have a fixed size. For instance, the request stack 2140 may store a fixed quantity of interaction identifiers including the interaction identifier of the request to which the request identifier belongs and one or more parent interaction identifiers.

In various embodiments, the utilization of a request stack having a fixed length (e.g., fixed quantity of stored interaction identifiers) may provide a mechanism to control storage and bandwidth throughout the service-oriented system. For example, the service-oriented system of various embodiments may in some cases receive numerous (e.g., thousands, millions, or some other quantity) of service requests per a given time period (e.g., per day, per week, or some other time period), such as requests from network-based browsers (e.g., web browsers) on client systems or requests from computer systems consuming network-based services (e.g., web services). In some embodiments, a request identifier adhering to the format of request identifier 2100 may be generated for each of such requests and each of any subsequent child requests. Due to the sheer number of requests that may be handled by the service-oriented systems of various embodiments, even when the request stack of a single request identifier is of a relatively small size (e.g., a few bytes), the implications on storage and bandwidth of the overall system may in some cases be significant. Accordingly, various embodiments may include ensuring that each request identifier contains a request stack equal to and/or less than a fixed stack size (e.g., a fixed quantity of interaction identifiers). Similarly, various embodiments may include fixing the length of each interaction identifier stored as part of the request stack (e.g., each interaction identifier could be limited to a single byte, or some other size). By utilizing interaction identifiers of fixed size and/or a request stack of a fixed size, various embodiments may be configured to control the bandwidth and/or storage utilization of the service-oriented system described herein. For instance, in one example, historical request traffic (e.g., the number of requests handled by the service oriented system per a given time period) may be monitored to determine an optimal request stack size and/or interaction identifier size in order to prevent exceeding the bandwidth or storage limitations of the service-oriented system.

In various embodiments, the utilization of a request stack having a fixed length (e.g., fixed quantity of stored interaction identifiers) may provide a mechanism to control one or more fault tolerance requirements of the system including but not limited to durability with respect to data loss and other errors (associated with individual services and host systems as well as the entire service-oriented system). For example, in some embodiments, the larger the size of the request stack (e.g., the more interaction identifiers included within a given request identifier), the more fault tolerant the system becomes.

In embodiments where request stack 2140 includes multiple interaction identifiers, the request stack may serve as a history of interaction identifiers. For instance, in the illustrated embodiment, interaction identifier 2130a-2130n may represent a series of interaction identifiers in ascending chronological order (where interaction identifier 2130a corresponds to the oldest service call and interaction identifier 2130n corresponds to the most recent service call).

In addition to the illustrated elements, request identifier 2100 may in various embodiments include one or more portions of data for error detection and/or error correction. Examples of such data include but are not limited to various types of checksums.

Figure 11:
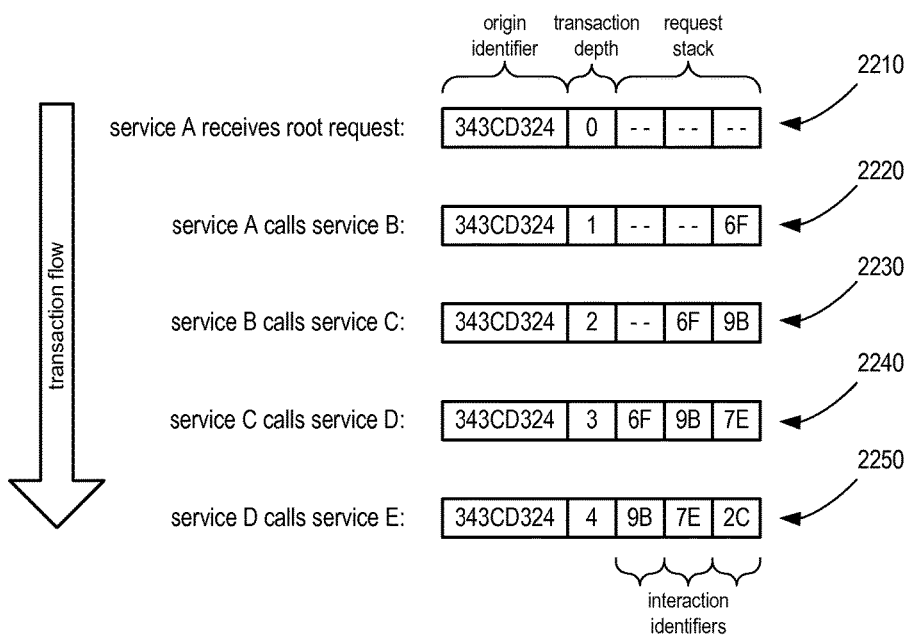
FIG. 11 illustrates an example transaction flow for fulfilling a root request, according to some embodiments.

FIG. 11 illustrates an example transaction flow for a root request and multiple child requests associated with the same root request. As illustrated, the transaction flow may begin with the receipt of a root request by service "A." For instance, this initial request might originate from a client computer system (e.g., from a web browser) or from another computer system requesting a service to consume. To completely fulfill the request, service "A" may perform some quantum of work and/or request the services of another service, such as service "B" (see, e.g., request identifier 2220). Service "B" may call another service "C" (see, e.g., request identifier 2230) and so on as illustrated (see, e.g., request identifiers 2240-2250). As illustrated, since each request identifier 2210-2250 corresponds to a request of the same transaction, each of such request identifiers include the same origin identifier "343CD324." For instance, each of services A-D may embed such origin identifier within each of such request identifiers (described in more detail with respect to FIG. 12). Furthermore, in the illustrated embodiment, the request identifier corresponding to the initial service request includes a transaction depth of 0 since the request identifier is a parent request identifier, as described above. Each subsequent child request identifier includes a transaction identifier equivalent to the previous requests transaction depth plus an increment value. In other embodiments, instead of incremented values, the transaction depths may be values that uniquely identify a transaction depth with respect to other depths of a given call graph; such values may but need not be increments of each other.

In the illustrated example, each request identifier 2210-2250 includes a request stack of a fixed size (e.g., three interaction identifiers). In other embodiments, larger or smaller request stacks may be utilized as long as the request stack includes at least one interaction identifier. Furthermore, in some embodiments, request stack sizes may be of uniform size across the service-oriented system (as is the case in the illustrated embodiment). However, in other embodiments, subsets of services may have different request stack sizes. For instance, a portion of the service-oriented system may utilize a particular fixed stack size for request identifiers whereas another portion of the service-oriented system may utilize another fixed stack fixed stack size for request identifiers.

Figure 12:
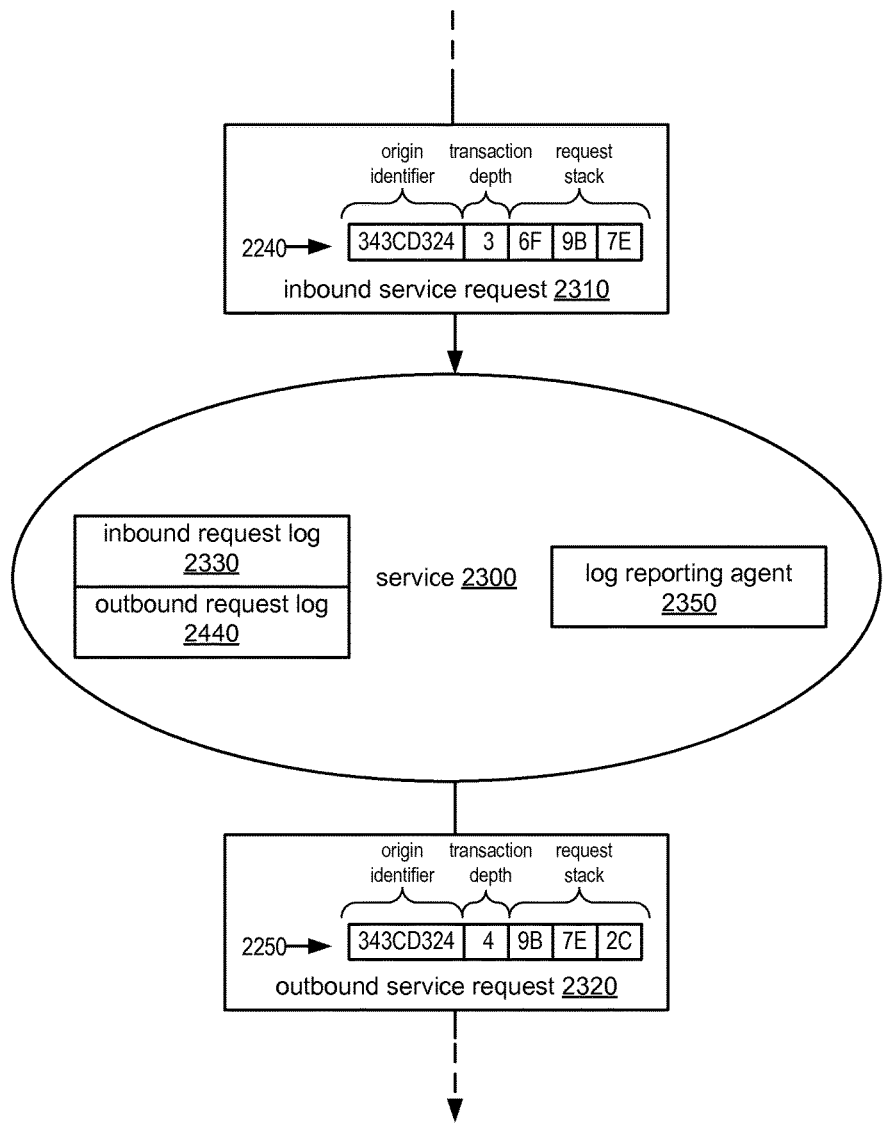
FIG. 12 illustrates one example of a service of a service-oriented system, according to some embodiments.

Referring collectively to FIG. 11 and FIG. 12, a representation of the receipt of an inbound service request (or service call) 2310 as well as the issuance of an outbound request 2320 by service 2300 is illustrated. Request identifiers 2240 and 2250 of FIG. 12 may correspond to the like-numbered elements of FIG. 11. As illustrated, service 2300 may receive an inbound service request 2310. Service 2300 may receive the inbound service request from another service within the service-oriented system, according to various embodiments. Inbound service request 2310 may include the requisite instructions or commands for invoking service 2300. In various embodiments, inbound service request 2310 may also include a request identifier 2240, which may include values for an origin identifier, transaction depth, and request stack, as described above with respect to FIG. 11. In various embodiments, request identifier 2240 may be embedded within inbound service request 2310 (e.g., as metadata). For example, according to various embodiments, the request identifier may be presented as part of metadata in a service framework, as part of a Hypertext Transfer Protocol (HTTP) header, as part of a SOAP header, as part of a Representational State Transfer (REST) protocol, as part of a remote procedural call (RPC), or as part of metadata of some other protocol, whether such protocol is presently known or developed in the future. In other embodiments, request identifier 2240 may be transmitted to service 2300 as an element separate from inbound service request 2310. In various embodiments, request identifier 2240 may be located elsewhere and inbound service request 2310 may include information (e.g., a pointer or memory address) for accessing the request identifier at that location.

In response to receiving the inbound service request, service 2300 may perform a designated function or quantum of work associated with the request, such as processing requests from client computer systems or computer systems requesting web services. In various embodiments, service 2300 may be configured to store a copy of request identifier 2240 within inbound log 2330. In some cases, service 2300 may require the services of another service in order to fulfill a particular request, as illustrated by the transmission of outbound service request 2320.

As is the case in the illustrated embodiment, service 2300 may be configured to send one or more outbound service requests 2320 to one or more other services in order to fulfill the corresponding root request. Such outbound service requests may also include a request identifier 2250 based at least in part on the received request identifier 2240. Request identifier 2250 may be generated by service 2300 or some other component with which service 2300 is configured to coordinate. Since outbound service request 2320 is caused at least in part by inbound service request 2310 (i.e., request 2320 stems from request 2310), the outbound service request 2320 and the inbound service request 2310 can be considered to be constituents of the same call graph. Accordingly, service 2300 (or some other component of the service-oriented framework) may be configured to generate request identifier 2250 such that the request identifier includes the same origin identifier as that of the inbound service request 2310. In the illustrated embodiment, such origin identifier is illustrated as "343CD324." For instance, in one embodiment, service 2300 may be configured to determine the value of the origin identifier of the request identifier of the inbound service request and write that same value into the request identifier of an outbound service request. In various embodiments, service 2300 (or some other component of the service-oriented framework) may also be configured to generate request identifier 2250 such that the request identifier includes a transaction depth value that indicates the transaction depth level is one level deeper than the transaction depth of the parent request (e.g., inbound service request 2310). For instance, in one embodiment, any given call graph may have various depths that each have their own depth identifier. In some embodiments, such depth identifiers may be sequential. Accordingly, in order to generate request identifier 2250 such that it includes a transaction depth value that indicates the transaction depth level is one level deeper than the transaction depth of the parent request (e.g., inbound service request 2310), service 2300 may be configured to determine the value of the transaction depth from the parent request, sum that value with an increment value (e.g., 1, or some other increment value), and store the result of such summation as the transaction depth value of the request identifier of the outbound service request. In the illustrated embodiment, the transaction depth value of the inbound request identifier 2240 is 3 whereas the transaction depth value of the outbound request identifier 2250 is 4.

In some cases, transaction depth identifiers may instead have identifiers that are not necessarily related to each other sequentially. Accordingly, in some embodiments, service 2300 may be configured to determine the transaction depth value from the request identifier of the parent request. From that value, service 2300 may determine the actual depth level corresponding to the transaction depth value (e.g., via a lookup table that provides a sequential listing of transaction depth levels to corresponding transaction depth values). From that depth level, service 2300 may be configured to determine the next sequential transaction depth (e.g., via a lookup table that provides a sequential listing of transaction depth levels to corresponding transaction depth values) as well as the transaction depth value corresponding to that transaction depth. Service 2300 may be configured to store such transaction depth value as the transaction depth value of the request identifier of the outbound service request.

Service 2300 may also be configured to generate request identifier 2250 of the outbound service request such that the request identifier has a request stack that includes an interaction identifier associated with the outbound service request and all of the interaction identifiers of the request stack of request identifier 2240 except for the oldest interaction identifier, which in many cases may also be the interaction identifier corresponding to a request at the highest transaction depth level when compared to the transaction depth levels associated with the other interaction identifiers of the request stack. For example, the root request may occur at transaction depth "0," a subsequent request may occur at transaction depth "1," another subsequent request may occur at transaction depth "2," and so on. In some respects, the request stack may operate in a fashion similar to that of a first in, first out (FIFO) buffer, as described in more detail below.

To generate the request stack of request identifier 2250, service 2300 may be configured to determine the interaction identifiers present within the request stack of request identifier 2240. Service 2300 may also be configured to determine the size of the request stack that is to be included within request identifier 2250 (i.e., the quantity of interaction identifiers to be included within the request stack). In some embodiments, this size may be specified by service 2300, another service within the service-oriented system (e.g., the service that is to receive request 2320), or some other component of the service-oriented system (e.g., a component storing a configuration file that specifies the size). In other embodiments, the size of the request stack may be specified by service 2300. In one embodiment, the size of the request stack may be dynamically determined by service 2300 (or some other component of the service-oriented system). For instance, service 2300 may be configured to dynamically determine the size of the request stack based on capacity and/or utilization of system bandwidth and/or system storage. In one example, service 2300 may be configured to determine that bandwidth utilization has reached a utilization threshold (e.g., a threshold set by an administrator). In response to such determination, service 2300 may be configured to utilize a smaller request stack size in order to conserve bandwidth. In various embodiments, a similar approach may be applied to storage utilization.

Dependent upon the size of the inbound request stack and the determined size of the outbound request stack (as described above), a number of different techniques may be utilized to generate the request stack of request identifier 2250, as described herein. In one scenario, the size of the inbound request stack may be the same as the determined size of the outbound request stack, as is the case in the illustrated embodiment. In this scenario, if the size of the outbound service request stack is to be n interaction identifiers, service 2300 may be configured to determine the (n−1) most recent interaction identifiers of the request stack of the inbound request identifier. Service 2300 may be configured to embed the (n−1) most recent interaction identifiers of the inbound request stack into the request stack of the outbound request identifier 2250 in addition to a new interaction identifier that corresponds to request 2320 issued by service 2300. In the illustrated embodiment, for each request identifier, the oldest interaction identifier is illustrated on the leftmost portion of the request stack and the newest interaction identifier is illustrated on the rightmost portion. In the illustrated embodiment, to generate the request stack of the outbound request identifier, service 300 may be configured to take the request stack of the inbound request identifier, drop the leftmost (e.g., oldest) interaction identifier, shift all other interaction identifiers to the left by one position, insert a newly generated interaction identifier for the outbound request, and embed this newly generated request stack in the request identifier of the outbound request.

In another scenario, the size of the request stack of the inbound service request identifier 2240 may be less than the size of the determined request stack size for the outbound service request identifier 2250. In these cases, the request stack size of the outbound service request may enable all of the interaction identifiers of the request stack of the inbound service request identifier to be included within the request stack of the outbound service request identifier. Accordingly, in various embodiments, service 2300 may be configured to embed all of the interaction identifiers in the request stack of the outbound request identifier 2250 in addition to a new interaction identifier that corresponds to request 2320 issued by service 2300.

In an additional scenario, the size of the request stack of the inbound service request identifier 2240 may be greater than the size of the determined request stack size for the outbound service request identifier 2250. For instance, if the size of the request stack for the outbound service request identifier is m interaction identifiers and the size of the request stack for the inbound request identifier is m+x interaction identifiers (where x and m are positive integers), service 2300 may be configured to determine the (m−1) most recent interaction identifiers of the request stack of the inbound request identifier. Service 2300 may also be configured to embed such (m−1) most recent interaction identifiers of the request stack of the inbound request identifier into the request stack of the outbound request identifier in addition to a new interaction identifier that corresponds to request issued by service 2300.

As described above, inbound request log 2330 may be managed by service 2300 and include records of one or more inbound service requests. In one embodiment, for each inbound service request received, service 2300 may be configured to store that request's identifier (which may include an origin identifier, transaction depth, and request stack, as illustrated) within the inbound request log. In various embodiments, service 2300 may also store within the log various metadata associated with each inbound service request identifier. Such metadata may include but is not limited to timestamps (e.g., a timestamp included within the request, such as a timestamp of when the request was generated, or a timestamp generated upon receiving the request, such as a timestamp of when the request was received by service 2300), the particular quantum of work performed in response to the request, and/or any errors encountered while processing the request. In various embodiments, outbound request log 2340 may include information similar to that of inbound request log 2330. For example, for each outbound request issued, service 2300 may store a record of such request within outbound request log 2340. For instance, service 2300 may, for each outbound request, store that request's identifier within outbound request log 2340. As is the case with inbound request log 2330, service 2300 may also store within outbound request log 2340 various metadata associated with requests including but not limited to metadata such as timestamps and errors encountered.

Figure 13:
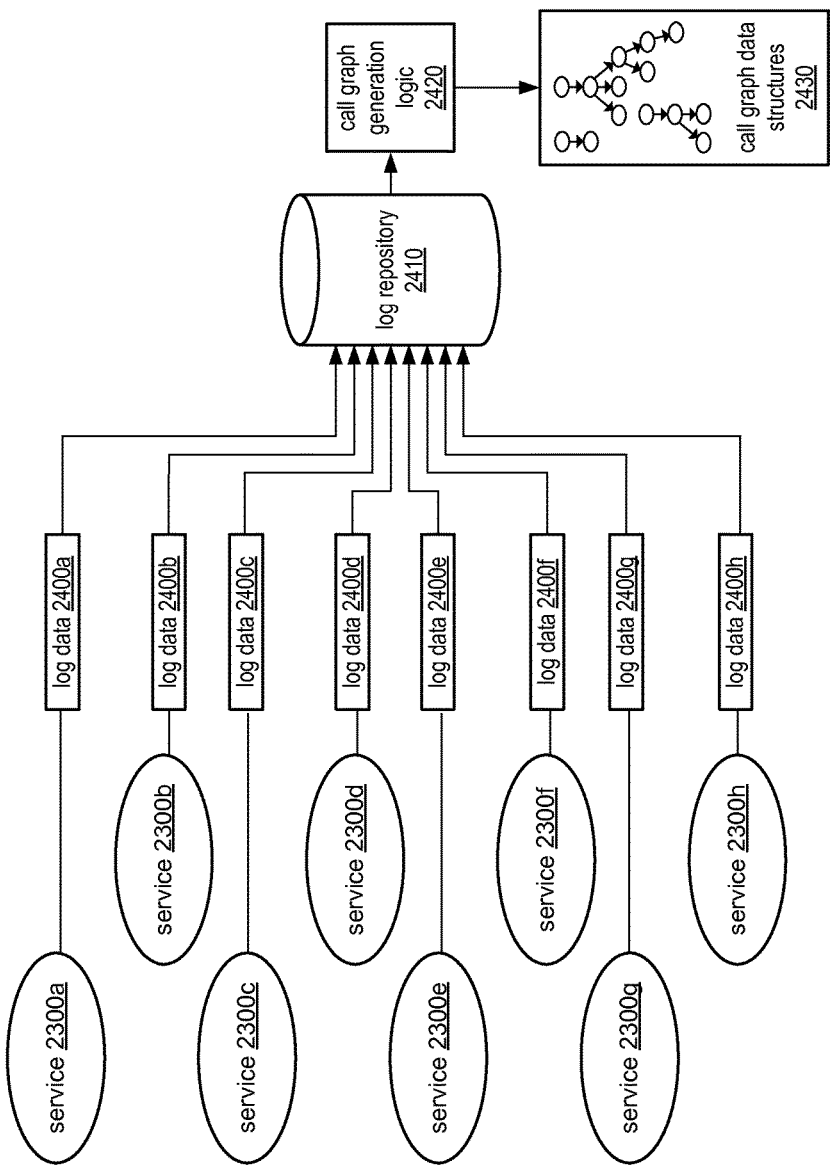
FIG. 13 illustrates an example data flow diagram for the collection of log data and generation of a call graph, according to some embodiments.

Referring collectively to FIG. 12 and FIG. 13, each service within the service-oriented system may include a log reporting agent, such as log reporting agent 2350. Log reporting agent 2350 may in various embodiments report the contents of inbound request log 2330 and/or outbound request log 2340 to a log repository (e.g., a data store, such as a database or other location in memory). One example of such a repository is illustrated log repository 2410 of FIG. 13. Various protocols for transmitting records from the logs of a service 2300 to a log repository may be utilized according to various embodiments. In some embodiments, the log reporting agent may periodically or aperiodically provide log information to the log repository. In various embodiments, the log reporting agent may be configured to service requests for log information, such as a request from the log repository or some other component of the service-oriented system. In some embodiments, in addition to or as an alternative to reporting log information from logs 2330 and 2340, log reporting agent 2350 may report log information to the log repository in real-time (in some cases bypassing the storage of information within the logs altogether). For instance, as a request is detected or generated, the log reporting agent may immediately report the information to the log repository. In various embodiments, log data may specify, for each request identifier, the service that generated the request identifier and/or the service that received the request identifier.

As illustrated in FIG. 13, multiple services 2300a-2300h within the service-oriented system may be configured to transmit respective log data 2400a-2400h to log repository 2410. The data stored within log repository 2410 (e.g., service request identifiers and associated metadata) may be accessed by call graph generation logic 2420. Call graph generation logic may be configured to generate a data structure representing one or more call graphs, such as call graph data structures 2430. As described above, the particular services called to fulfill a root request may be represented as a call graph that specifies, for a particular service called, the service that called the particular service and any services called by the particular service. For instance, since a root request may result in a service call which may propagate into multiple other services calls throughout the service oriented system, a call graph may in some cases include a deep and broad tree with multiple branches each representing a sequences of service calls.

Figure 14:
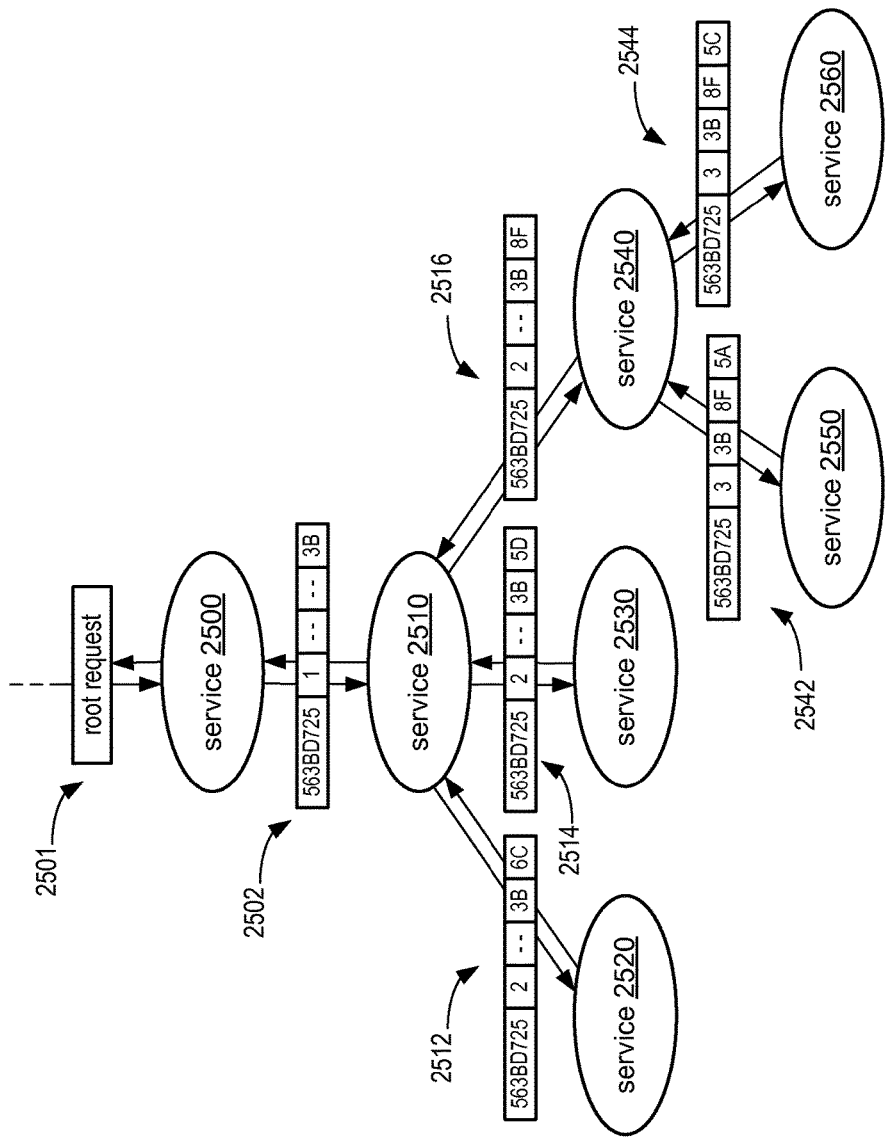
FIG. 14 illustrates an example visual representation of a call graph and request identifiers from which such call graph is generated, according to some embodiments.

FIG. 14 illustrates a visual representation of such a call graph data structure that may be generated by call graph generation logic 2420. In various embodiments, a call graph data structure may include any data structure that specifies, for a given root request, all the services called to fulfill that root request. Note that while FIG. 14 and the associated description pertain to an acyclic call graph, this representation is not inclusive of all variations possible for such a call graph. For instance, in other embodiments, a call graph may be represented by any directed graph (including graphs that include directed cycles) dependent on the nature of the service requests within the service-oriented system. Additionally, for a given one of such services, the call graph data structure may specify the service that called the given service as well as any services called by the given service. The call graph data structure may additionally indicate a hierarchy level of a particular service within a call graph. For instance, in the illustrated embodiment, service 2500 is illustrated as a part of the first level of the hierarchy, service 2510 is illustrated as part of the second level of the hierarchy and so on.

To generate such a call graph, call graph generation logic may be configured to collect request identifiers (e.g., request identifiers 2502, 2512, 2514, 2516, 2542 and 2544) that each include the same origin identifier. In the illustrated embodiment, "563BD725" denotes an example of such an origin identifier. In various embodiments, call graph generation logic may mine (e.g., perform a search or other data analysis) log data associated with various services in order to find a collection of request identifiers that correspond to the same origin identifier (and thus correspond to the same root request, e.g., root request 2501).

In various embodiments, inbound and outbound request logs may be maintained for each service. In these cases, call graph generation logic 2420 may be configured to compare request identifiers in order to determine that a given service called another service in the process of fulfilling the root request. For example, in one embodiment, the call graph generation logic may compare a request identifier from a given service's outbound request log to the request identifier from another service's inbound request log. If a match is detected, the call graph generation logic may indicate that the service corresponding to that outbound request log called the service corresponding to that inbound request log. For example, call graph generation logic may discover a request identifier equivalent to request identifier 2502 within the outbound request log associated with service 2500. In this example, call graph generation logic may also locate a request identifier equivalent to request identifier 2502 within the inbound log of service 2510. In response to this match, call graph generation logic may indicate that an edge (representing a service call) exists between two particular nodes of the call graph (e.g., the node corresponding to service 2500 and the node corresponding to service 2510). The above-described process may be repeated to determine the illustrated edges that correspond to request identifiers 2512, 2514, 2516, 2542 and 2544. In other embodiments, since the manner in which interaction identifiers are generated may ensure that each interaction identifier is unique for a given depth level and origin identifier, the call graph generation logic may instead search for matching interaction identifiers between request identifiers of adjacent depth levels instead of searching for matching request identifiers.

In other embodiments, only one type of log (e.g., either inbound or outbound) may be maintained for a given service. For example, if only outbound request logs are maintained for each of the services, then the call graph generation logic 2420 may utilize different techniques for determining an edge that represents a service call in the call graph data structure. In one example, call graph generation logic may compare two request identifiers that have adjacent depth values. For instance, in the illustrated embodiment, the call graph generation logic may be configured to compare request identifier 2502 to request identifier 2514, since such request identifiers contain the adjacent depth values of 1 and 2. In this case, the call graph generation logic may determine whether the most recent interaction identifier of request identifier 2502 (e.g., 3B) is equivalent to the 2nd most recent interaction identifier of request identifier 2514 (e.g., 3B). For request identifier 2514, the 2nd most recent interaction identifier is evaluated since the most recent interaction identifier position will be fill with a new interaction identifier inserted by the service that generated request identifier 2514 (in this case, service 2530). In the illustrated embodiment, this comparison returns a match since the values for the interaction identifiers are equivalent. In response to such match, the call graph generation logic may be configured to indicate within the data structure that an edge (representing a service call) exists between service 2500 and 2510.

In various embodiments, the call graph generation logic 2420 may be configured to generate a call graph in the presence of data loss. For instance, consider the case where the service oriented system maintains outbound service logs and the log data for service 2510 is lost, as might be the case in the event of a failure on the host system on which service 2510 runs or in the case of a failure of log repository 2410. Since the request identifiers of various embodiments may include a request stack of multiple interaction identifiers, multiple layers of redundancy may be utilized to overcome a log data loss. In this example, since the outbound log data for service 2510 is lost, request identifiers 2512, 2514, and 2516 may not be available. Accordingly, the call graph generation logic may be configured to utilize a request identifier from a lower depth level to reconstruct the pertinent portion of the call graph. While request identifiers 2512, 2514, and 2516 may be not be available due to data loss, the request identifier 2542 (and 2544) is available. Since request identifier 2542 includes a stack or "history" of interaction identifiers, that request identifier may be utilized to obtain information that would have been available if request identifier 2516 were not lost to data failure. Since request identifier 2542 has a depth level that is two levels lower than the depth level of request identifier 2502, the call graph generation logic may utilize the third most recent (not the second most recent as was the case in the previous example) interaction identifier. In this example, the third most recent interaction identifier is evaluated since that position would contain the interaction identifier generated by service 2500 in the illustrated embodiment. If the call graph generation logic determines that the most recent interaction identifier of request identifier 2502 matches the third most recent interaction identifier of request identifier 2542, the call graph generation logic may determine that service 2500 called service 2510 even if the log data for service 2510 is unavailable (e.g., due to data loss). Accordingly, the call graph generation logic may indicate an edge (representing a service call) exists between service 2500 and 2510 within the generated call graph data structure.

In addition to the request identifiers described above, metadata relating to service interactions may be collected (e.g., by the log reporting agent 2350) and used in the generation of call graphs. In various embodiments, the metadata includes, but is not limited to, any of the following: a timestamp, an indication of whether the interaction is on the client side or server side, the name or other identifier of the application programming interface (API) invoked for the interaction, the host name, data that describes the environment (e.g., a version number of a production environment or test environment), and/or any other metadata that is suitable for building the call graphs and/or comparing one set of call graphs to another. The collected metadata may be used to determine a graph of service interactions, i.e., by identifying or distinguishing nodes and edges from other nodes and edges. If the metadata includes information identifying a test run and/or the version of an environment, then the metadata may enable reporting of test results (e.g., test coverage metrics and/or reports) by test run and/or environment.

In some embodiments, various metadata may also be included within such call graph data structure, such as timestamps, the particular quantum of work performed in response to a given request, and/or any errors encountered while processing a given request. For example, the illustrated services may record timestamps of when a request is received, when a request is generated, and/or when a request is sent to another service. These timestamps may be appended to the call graph data structure to designate latency times between services (e.g., by calculating the time difference between when a request is sent and when it is received). In other cases, metadata may include error information that indicates any errors encountered or any tasks performed while processing a given request. In some embodiments, such metadata may include host address (e.g., an Internet Protocol address of a host) in order to generate a graph structure that indicates which host machines are processing requests (note that in some embodiments host machines may host multiple different services).

The system and method for tracking service requests described herein may be configured to perform a variety of methods. The call graph generation logic described herein may be configured to receive multiple request identifiers, each associated with a respective one of multiple service requests. Each given request identifier may include an origin identifier associated with a root request, a depth value specifying a location of the associated service request within a sequence of service requests, and a request stack including one or more interaction identifiers assigned to a service request issued from one service to another service. For example, receiving multiple request identifiers may in some cases include receiving log data that includes such request identifiers. For instance, the call graph generation logic may receive log data directly from host systems that host the services of the service-oriented system described herein. In some cases, the call graph generation logic may receive log data from one or more log repositories such as log repository 2410 described above. In general, the call graph generation logic may utilize any of the techniques for obtaining request identifiers described above with respect to call graph generation logic 2420.

The call graph generation logic may further, based on multiple ones of the request identifiers that each include an origin identifier associated with a particular root request, generate a data structure that specifies a hierarchy of services called to fulfill that particular root request; wherein, based on one or more of the interaction identifiers and one or more of the depth values, the generated data structure specifies, for a given service of said hierarchy: a parent service that called the given service, and one or more child services called by the given service. For example, in various embodiments, generating the data structure may include determining that each of a subset of the multiple request identifiers includes the same origin identifier as well as indicating each associated service request as a node of the hierarchy within the data structure. Examples of such nodes are illustrated in FIG. 14 as services 2500, 2510, 2520, 2530, 2540, 2550 and 2560. Generating such data structure may also include, for each node within the hierarchy, assigning the node to a level within the hierarchy based on the transaction depth value of the request identifier associated with the service request corresponding to that node. Examples of such depth level values are described above with respect to transaction depth 2120 of FIG. 10. Generating the data structure may also include determining that the request stack of a given node at a given level within the hierarchy includes an interaction identifier that is the same as an interaction identifier of the request stack of another node located within an adjacent level of the hierarchy. In response to determining such match, the call graph generation logic may indicate a service call as an edge between said given node and said other node. Examples of such an edge are illustrated as the edges coupling the nodes of FIG. 14 described above.

In various embodiments, the techniques for analyzing request identifiers and generating a call graph may be performed on an incremental basis. For example, as request identifiers are updated (e.g., as logs and/or log repositories receive new data), the call graph generation logic described herein may be configured to incrementally update the generated call graph data structure to reflect the newly reported requests. In some embodiments, the techniques described herein may be performed on a depth-level basis. For example, as request identifiers are received (e.g., by the log repository or call graph generation logic described herein), each identifier may be categorized (e.g., placed in a categorized directory) based on transaction depth.

In various embodiments, the generated call graph data structures described herein may be utilized for diagnostic purposes. For instance, as described above, the call graph data structure may include metadata, such as a record of error(s) that occur when processing a request. Because this metadata may be associated with specific nodes and/or service calls, various embodiments may include determining sources of errors or faults within the service-oriented system. In some embodiments, the generated call graph data structures described herein may be utilized for analytical purposes. For example, based on call graph data structures generated as described herein, various embodiments may include determining historical paths of service calls and/or path anomalies. For instance, various embodiments may include detecting that, for a given root request, one or more services are being called unnecessarily. For instance, such services may not be needed to fulfill the particular root request. Accordingly, in some embodiments, such services may be culled from processing further requests similar to or the same as the root request that originally initiated the unnecessary service calls (e.g., a re-orchestration process may be employed to modify the particular services called for a particular type of request). By removing such unnecessary service calls, various embodiments may conserve resources such as storage and/or bandwidth. In other embodiments, the generated call graph data structures described herein may be utilized for auditing purposes. For example, in the case that the service oriented system provides network-based services (e.g., web services) to consumers of such services (who may provide remuneration for the consumption of services), such consumers may desire to at least occasionally view information that confirms they are being charged in a fair manner. To provide such information to the consumer, various embodiments may include providing the consumer with various records such as records that indicate how frequent they consume network-based services and in what quantity. Such information may be generated based on the call graph data structures described herein.

In one embodiment, the call graph generation logic may receive a first request identifier associated with an inbound service request. The request identifier may include an origin identifier associated with a root request, a depth value specifying a location of the inbound service request within a sequence of service requests, and a request stack including multiple interaction identifiers each assigned to a respective service request issued from one service to another service of multiple services. One example of receiving such a request identifier is illustrated in FIG. 12 as the receipt of inbound service request identifier 2240 by service 2300.

The call graph generation logic may also generate a new request stack. The new request stack may include all of the interaction identifiers of the first request identifier except for an oldest one of the interaction identifiers. For instance, as illustrated in FIG. 12, the request stack of outbound request identifier 2250 does not include "6F," which is the oldest interaction identifier of the inbound service request identifier 2240. The new request stack may also include a new interaction identifier associated with an outbound service request. For instance, as illustrated in FIG. 12, the request stack of outbound service request identifier 2250 includes a new interaction identifier "2C."

The call graph generation logic may also generate a second request identifier associated with the outbound service request. The second request identifier may include the origin identifier, a new depth value specifying a location of the outbound service request within the sequence of service requests, and the new request stack. One example of such a second request identifier is illustrated as outbound service request identifier 2250 of FIG. 12.

In various embodiments, the call graph generation logic may also generate the new depth value such that the new depth value is a result of incrementing the first depth value. For example, in the illustrated embodiment of FIG. 12, the depth value of the outbound request identifier (i.e., "4") may be the result of incrementing the depth value of the inbound request identifier (i.e., "3"). In various embodiments, the call graph generation logic may store either of (or both of) the first request identifier and the second request identifier as log data accessible to one or more computer systems. For instance, in the illustrated embodiment of FIG. 12, the inbound and outbound request identifiers may be stored in inbound request log 2330 and outbound request log 2340, respectively.

For each of the interactions between the services 2500, 2510, 2520, 2530, 2540, 2550, and 250, a request path or downstream path is shown. For each of the interactions between the services 2500, 2510, 2520, 2530, 2540, 2550, and 250, a reply path or upstream path is also shown. In response to each request, the recipient (i.e., downstream) service may send a reply to the requesting (i.e., upstream) service at any appropriate point in time, e.g., after completing the requested operation and receiving replies for any further downstream services called to satisfy the request. A terminal downstream service (i.e., a service that calls no further services) may send a reply to the immediately upstream service upon completion of the requested operation or upon encountering an error that prevents completion of the requested operation. A reply may include any suitable data and/or metadata, such as the output of a requested service in the reply path and/or any error codes or condition codes experienced in the reply path. A reply may also include any suitable element(s) of identifying information from the request stack of the corresponding request, such as the origin identifier and/or interaction identifiers shown in FIG. 10.

Figure 15:
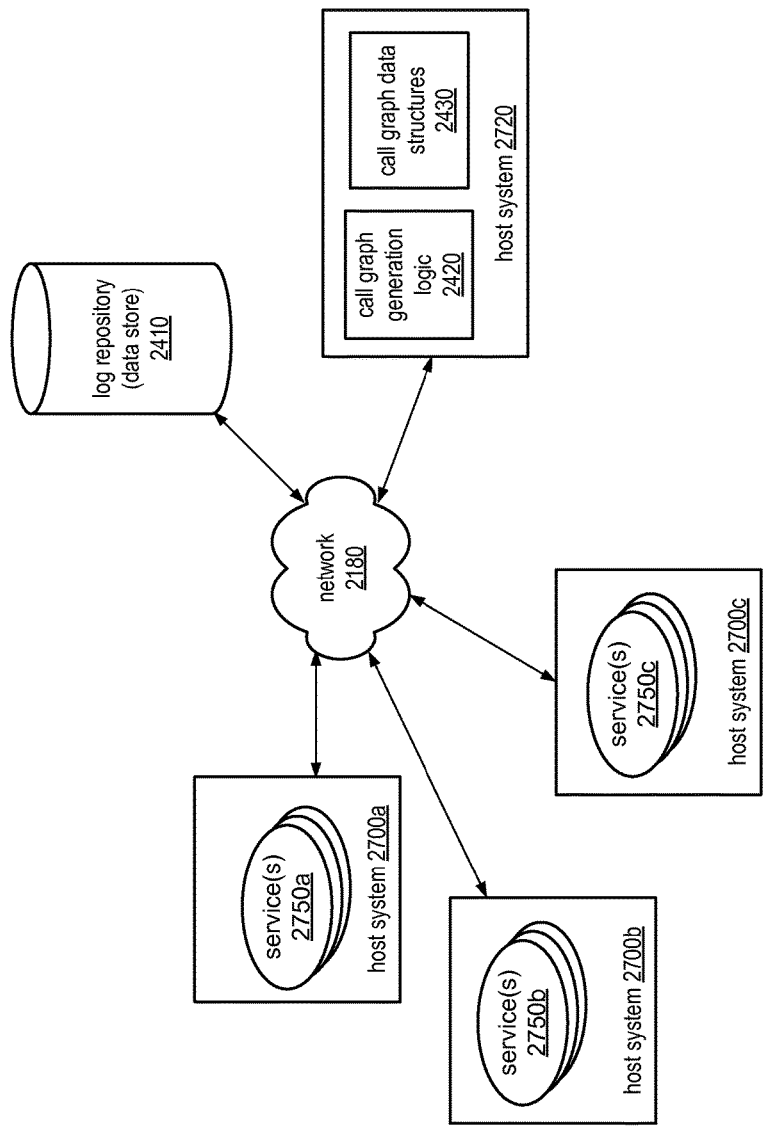
FIG. 15 illustrates an example system configuration for tracking service requests, according to some embodiments.

One example system configuration for tracking service requests is illustrated in FIG. 15. As illustrated, the various components of the example system are coupled together via a network 2180. Network 2180 may include any combination of local area networks (LANs), wide area networks (WANs), some other network configured to communicate data to/from computer systems, or some combination thereof. Each of host systems 2700a-c and 2720 may be implemented by a computer system, such as computer system 3000 described below. Call graph generation logic 2420 may be implemented as software (e.g., program instructions executable by a processor of host system 2720), hardware, or some combination thereof. Call graph data structures 2430 may be generated by host system logic 420 and stored in a memory of host system 2720. Log repository 2410 may be implemented as a data store (e.g., database, memory, or some other element configured to store data) coupled to network 2180. In other embodiments, log repository 2410 may be implemented as a backend system of host system 2720 and accessible to host system 2720 via a separate network. Host system 2700a may be configured to execute program instruction to implement one or more services 2750a. Such services may include but are not limited to one or more of network-based services (e.g., a web service), applications, functions, objects, methods (e.g., objected-oriented methods), subroutines, or any other set of computer-executable instructions. Examples of services 2750 include any of the services described above. Host systems 2700b-c and services 2750b-c may be configured in a similar manner.

In various embodiments, the various services of the illustrated embodiment may be controlled by a common entity. However, in some embodiments, external systems, such as a system controlled by another entity, may be called as part of a sequence of requests for fulfilling a root request. In some cases, the external system may adhere to the request identifier generation techniques described herein and may integrate with the various services described above. In the event that an external system does not adhere to the various techniques for generating request identifiers as described herein, the external system may be treated as a service that is not visible in the call graph or, alternatively, requests sent back from the external system may be treated as new requests altogether (e.g., as root requests). In various embodiments, the system configuration may include one or more proxy systems and/or load balancing systems. In some cases, the system configuration may treat these systems as transparent from a request identifier generation perspective. In other cases, these systems may generate request identifiers according to the techniques described above.

In some embodiments, the service-oriented system described herein may be integrated with other external systems that may utilize different techniques for identifying requests. For instance, the request identifiers described herein may in various embodiments be wrapped or enveloped in additional data (e.g., additional identifiers, headers, etc.) to facilitate compatibility with various external systems.

Illustrative Computer System

In at least some embodiments, a computer system that implements a portion or all of one or more of the technologies described herein may include a general-purpose computer system that includes or is configured to access one or more computer-readable media. FIG. 16 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 16 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Embodiments of the disclosure can be described in view of the following clauses:

Clause 1. A system, comprising:
a plurality of computing devices configured to implement a capacity modeling system and a service-oriented system, wherein the service-oriented system comprises a plurality of services, wherein the plurality of services are configured to:
generate trace data for a plurality of service interactions between individual ones of the plurality of services, wherein the trace data comprises data indicative of call paths between the individual ones of the plurality of services; and
send the trace data to the capacity modeling system; and
wherein the capacity modeling system is configured to:
determine a plurality of demand drivers that drive a plurality of calls to a particular service of the plurality of services, wherein the plurality of demand drivers are determined based on the trace data;
determine a respective call volume from individual ones of the plurality of demand drivers to the particular service;
determine a total call volume to the particular service, wherein the total call volume is determined as a summation of the respective call volumes from the individual ones of the plurality of demand drivers;
determine a capacity forecast for the particular service as a function of the total call volume, wherein the capacity forecast indicates a quantity of computing resources to provide the particular service; and
modify a quantity or configuration of computing resources in the service-oriented system based on the capacity forecast.

Clause 2. The system as recited in clause 1, wherein the capacity modeling system is configured to:
update the capacity forecast one or more times based on additional trace data.

Clause 3. The system as recited in clause 1 or 2, wherein the plurality of demand drivers, the respective call volumes, the total call volume, and the capacity forecast are determined through execution of program instructions.

Clause 4. The system as recited in any of clauses 1 to 3, wherein the capacity forecast for the particular service is determined based on a resource count function for the particular service, wherein the resource count function for the particular service is updated in response to a modification of program code for the particular service.

Clause 5. A computer-implemented method, comprising:
determining a plurality of demand drivers for a particular service in a service-oriented system, wherein the plurality of demand drivers are determined to drive a plurality of service calls to the particular service;
determining a total call volume to the particular service, wherein the total call volume is determined based on the plurality of demand drivers; and
determining an optimized quantity of computing resources to provide the particular service based on the total call volume.

Clause 6. The method as recited in clause 5, further comprising:
increasing or decreasing a quantity of computing resources to be acquired based on the optimized quantity.

Clause 7. The method as recited in clause 5 or 6, further comprising:
modifying a configuration of one or more computing resources based on the optimized quantity.

Clause 8. The method as recited in any of clauses 5 to 7, further comprising:
determining a respective call volume for individual ones of the plurality of demand drivers, wherein the total call volume is determined as a summation of the respective call volumes for individual ones of the plurality of demand drivers.

Clause 9. The method as recited in any of clauses 5 to 8, wherein the plurality of demand drivers are determined based on trace data for a plurality of service interactions between individual services in the service-oriented system, and wherein the method further comprises:
updating the optimized quantity one or more times based on additional trace data.

Clause 10. The method as recited in any of clauses 5 to 9, wherein the plurality of demand drivers, the total call volume, and the optimized quantity of computing resources are determined through execution of program instructions.

Clause 11. The method as recited in any of clauses 5 to 10, wherein the optimized quantity of computing resources is determined based on a resource count function for the particular service, wherein the resource count function for the particular service is updated in response to a modification of program code for the particular service.

Clause 12. The method as recited in any of clauses 5 to 11, wherein the resource count function for the particular service comprises the total call volume divided by a calibrated optimal volume per computing device.

Clause 13. A computer-readable storage medium storing program instructions computer-executable to perform:
determining a plurality of demand drivers based on trace data for a plurality of service interactions between individual ones of a plurality of services in a service-oriented system, wherein the plurality of demand drivers are determined to drive a generation of service calls to a particular service of the plurality of services;

determining a total call volume to the particular service, wherein the total call volume is determined on the plurality of demand drivers; and determining a capacity forecast for the particular service as a function of the total call volume, wherein the capacity forecast indicates a quantity of computing resources to provide the particular service.

Clause 14. The computer-readable storage medium as recited in clause 13, wherein the program instructions are further computer-executable to perform:

increasing or decreasing a quantity of computing resources to be acquired based on the capacity forecast.

Clause 15. The computer-readable storage medium as recited in clause 13 or 14, wherein the program instructions are further computer-executable to perform:

modifying a configuration of one or more computing resources based on the capacity forecast.

Clause 16. The computer-readable storage medium as recited in any of clauses 13 to 15, wherein the program instructions are further computer-executable to perform:

determining a respective call volume for individual ones of the plurality of demand drivers, wherein the total call volume is determined as a summation of the respective call volumes for individual ones of the plurality of demand drivers.

Clause 17. The computer-readable storage medium as recited in any of clauses 13 to 16, wherein the program instructions are further computer-executable to perform:

updating the capacity forecast one or more times based on additional trace data.

Clause 18. The computer-readable storage medium as recited in any of clauses 13 to 17, wherein the plurality of demand drivers, the total call volume, and the capacity forecast are determined automatically.

Clause 19. The computer-readable storage medium as recited in any of clauses 13 to 18, wherein the capacity forecast for the particular service is determined based on a resource count function for the particular service, wherein the resource count function for the particular service is updated in response to a modification of program code for the particular service.

Clause 20. The computer-readable storage medium as recited in any of clauses 13 to 19, wherein the resource count function for the particular service comprises the total call volume divided by a calibrated optimal volume per computing device.

Clause 21. A system, comprising:

a plurality of computing devices configured to implement a computing resource forecasting and optimization system and a service-oriented system, wherein the service-oriented system comprises a plurality of services, and wherein the computing resource forecasting and optimization system is configured to:

determine a projected service call volume for a particular service of the plurality of services for a future period of time;

calibrate one or more computing resources for optimum throughput for the particular service;

determine an optimum set of computing resources to support the projected service call volume for the particular service, wherein the optimum set of computing resources comprises individual ones of the computing resources calibrated for optimum throughput for the particular service, wherein the optimum set of computing resources is determined based on a throughput metric; and allocate the optimum set of computing resources to provide the particular service for the future period of time.

Clause 22. The system as recited in clause 21, wherein at least a portion of the optimum set of computing resources are allocated from a global pool, wherein the global pool comprises a plurality of computing resources available to one or more other services of the plurality of services.

Clause 23. The system as recited in clause 21 or 22, wherein the computing resource forecasting and optimization system is configured to:

determine that a global pool of computing resources is insufficient to fulfill the optimum set of computing resources, wherein the global pool comprises a plurality of computing resources available to individual ones of the plurality of services; and purchase or lease additional computing resources to fulfill the optimum set of computing resources.

Clause 24. The system as recited in any of clauses 21 to 23, wherein the computing resource forecasting and optimization system is configured to:

determine a second projected service call volume for the particular service for a second future period of time;

determine a second set of computing resources to support the second projected service call volume for the particular service, wherein the second set of computing resources comprises fewer computing resources than the optimum set of computing resources; and return at least a portion of the optimum set of computing resources to a global pool, wherein the global pool comprises a plurality of computing resources available to one or more other services of the plurality of services.

Clause 25. A computer-implemented method, comprising:

determining a projected service call volume for a particular service of a plurality of services for a future period of time;

determining a set of computing resources to support the projected service call volume for the particular service, wherein the set of computing resources is determined based on automated analysis of the projected service call volume, and wherein the set of computing resources is automatically calibrated for throughput for the particular service; and allocating the set of computing resources to provide the particular service for the future period of time.

Clause 26. The method as recited in clause 25, wherein the set of computing resources is determined based on an efficiency index, wherein the efficiency index is determined as an optimum throughput divided by a peak actual throughput for the particular service over a period of time using one or more of the set of computing resources.

Clause 27. The method as recited in clause 25 or 26, further comprising:

determining a forecast for one or more demand drivers for the future period of time, wherein the projected service call volume is determined based on the forecast for the one or more demand drivers.

Clause 28. The method as recited in any of clauses 25 to 27, wherein the projected service call volume is determined based on automated analysis of trace data for individual ones of the plurality of services, wherein the automated analysis of the trace data determines one or more relationships between the particular service and individual demand drivers.

Clause 29. The method as recited in any of clauses 25 to 28, wherein the projected service call volume is determined based on a time-series analysis of service call volume history for the particular service.

Clause 30. The method as recited in any of clauses 25 to 29, wherein at least a portion of the set of computing resources are allocated from a global pool, wherein the global pool comprises a plurality of computing resources available to one or more other services of the plurality of services.

Clause 31. The method as recited in any of clauses 25 to 30, further comprising:
 determining that a global pool of computing resources is insufficient to fulfill the set of computing resources, wherein the global pool comprises a plurality of computing resources available to individual ones of the plurality of services; and
 purchasing or leasing additional computing resources to fulfill the set of computing resources.

Clause 32. The method as recited in any of clauses 25 to 31, further comprising:
 determining a second projected service call volume for the particular service for a second future period of time;
 determining a second set of computing resources to support the second projected service call volume for the particular service, wherein the second set of computing resources comprises fewer computing resources than the set of computing resources; and
 returning at least a portion of the set of computing resources to a global pool, wherein the global pool comprises a plurality of computing resources available to one or more other services of the plurality of services.

Clause 33. A computer-readable storage medium storing program instructions computer-executable to perform:
 determining a projected service call volume for a particular service of a plurality of services for a future period of time;
 determining a set of computing resources to support the projected service call volume for the particular service, wherein the set of computing resources is determined based on automated analysis of the projected service call volume, and wherein the set of computing resources is automatically calibrated for throughput for the particular service; and
 allocating the set of computing resources to provide the particular service for the future period of time.

Clause 34. The computer-readable storage medium as recited in clause 33, wherein the set of computing resources is determined based on an efficiency index, wherein the efficiency index is determined as an optimum throughput divided by a peak actual throughput for the particular service over a period of time using one or more of the set of computing resources.

Clause 35. The computer-readable storage medium as recited in clause 33 or 34, wherein the program instructions are further computer-executable to perform:
 determining a forecast for one or more demand drivers for the future period of time, wherein the projected service call volume is determined based on the forecast for the one or more demand drivers.

Clause 36. The computer-readable storage medium as recited in any of clauses 33 to 35, wherein the projected service call volume is determined based on automated analysis of trace data for individual ones of the plurality of services, wherein the automated analysis of the trace data determines one or more relationships between the particular service and individual demand drivers.

Clause 37. The computer-readable storage medium as recited in any of clauses 33 to 36, wherein the projected service call volume is determined based on a time-series analysis of service call volume history for the particular service.

Clause 38. The computer-readable storage medium as recited in any of clauses 33 to 37, wherein at least a portion of the set of computing resources are allocated from a global pool, wherein the global pool comprises a plurality of computing resources available to one or more other services of the plurality of services.

Clause 39. The computer-readable storage medium as recited in any of clauses 33 to 39, wherein the program instructions are further computer-executable to perform:
 determining that a global pool of computing resources is insufficient to fulfill the set of computing resources, wherein the global pool comprises a plurality of computing resources available to individual ones of the plurality of services; and
 purchasing or leasing additional computing resources to fulfill the set of computing resources.

Clause 40. The computer-readable storage medium as recited in any of clauses 33 to 39, wherein the program instructions are further computer-executable to perform:
 monitoring performance of the set of computing resources after the set of resources is calibrated for throughput for the particular service;
 determining that the performance is not within predetermined boundaries; and
 in response to determining that the performance is not within the predetermined boundaries, recalibrating the set of computing resources for throughput for the particular service.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
  a plurality of computing devices configured to implement a computing resource forecasting and optimization system and a service-oriented system, wherein the service-oriented system comprises a plurality of services, and wherein the computing resource forecasting and optimization system is configured to:
    determine a projected service call volume for a particular service of the plurality of services for a future period of time;
    calibrate one or more computing resources for optimum throughput for the particular service;
    determine an optimum set of computing resources to support the projected service call volume for the particular service, wherein the optimum set of computing resources comprises individual computing resources of the computing resources calibrated for optimum throughput for the particular service, wherein the optimum set of computing resources is determined based on a throughput metric;
    allocate and configure the optimum set of computing resources to provide the particular service for the future period of time;
    determine a second projected service call volume for the particular service for a second future period of time;
    determine a second set of computing resources to support the second projected service call volume for the particular service, wherein the second set of computing resources comprises fewer computing resources than the optimum set of computing resources; and
    return at least a portion of the optimum set of computing resources to a global pool, wherein the global pool comprises a plurality of computing resources available to one or more other services of the plurality of services.

2. The system as recited in claim 1, wherein at least a portion of the optimum set of computing resources are allocated from a global pool, wherein the global pool comprises a plurality of computing resources available to one or more other services of the plurality of services.

3. The system as recited in claim 1, wherein the computing resource forecasting and optimization system is configured to:
  determine that a global pool of computing resources is insufficient to fulfill the optimum set of computing resources, wherein the global pool comprises a plurality of computing resources available to individual services of the plurality of services; and
  purchase or lease additional computing resources to fulfill the optimum set of computing resources.

4. The system as recited in claim 1, wherein the computing resource forecasting and optimization system is configured to:
  test a plurality of configurations for each computing resource of the one or more computing resources to identify an optimum configuration of each computing resource for optimum throughput.

5. A computer-implemented method, comprising:
  determining a projected service call volume for a particular service of a plurality of services for a future period of time;
  determining a set of computing resources to support the projected service call volume for the particular service, wherein the set of computing resources is determined based on automated analysis of the projected service call volume, and wherein the set of computing resources is automatically calibrated for throughput for the particular service;
  allocating and configuring the set of computing resources to provide the particular service for the future period of time;
  determining a second projected service call volume for the particular service for a second future period of time;
  determining a second set of computing resources to support the second projected service call volume for the particular service, wherein the second set of computing resources comprises fewer computing resources than the set of computing resources; and
  returning at least a portion of the set of computing resources to a global pool, wherein the global pool comprises a plurality of computing resources available to one or more other services of the plurality of services.

6. The method as recited in claim 5, wherein the set of computing resources is determined based on an efficiency index, wherein the efficiency index is determined as an optimum throughput divided by a peak actual throughput for the particular service over a period of time using one or more of the set of computing resources.

7. The method as recited in claim 5, further comprising:
  determining a forecast for one or more demand drivers for the future period of time, wherein the projected service call volume is determined based on the forecast for the one or more demand drivers.

8. The method as recited in claim 5, wherein the projected service call volume is determined based on automated analysis of trace data for individual services of the plurality of services, wherein the automated analysis of the trace data determines one or more relationships between the particular service and individual demand drivers.

9. The method as recited in claim 5, wherein the projected service call volume is determined based on a time-series analysis of service call volume history for the particular service.

10. The method as recited in claim 5, wherein at least a portion of the set of computing resources are allocated from a global pool, wherein the global pool comprises a plurality of computing resources available to one or more other services of the plurality of services.

11. The method as recited in claim 5, further comprising:
  determining that a global pool of computing resources is insufficient to fulfill the set of computing resources, wherein the global pool comprises a plurality of computing resources available to individual services of the plurality of services; and
  purchasing or leasing additional computing resources to fulfill the set of computing resources.

12. The method as recited in claim 5, further comprising:
  testing a plurality of configurations for each computing resource of the one or more computing resources to identify an optimum configuration of each computing resource for optimum throughput.

13. A non-transitory, computer-readable storage medium storing program instructions computer-executable to perform:
  determining a projected service call volume for a particular service of a plurality of services for a future period of time;
  determining a set of computing resources to support the projected service call volume for the particular service, wherein the set of computing resources is determined based on automated analysis of the projected service call volume, and wherein the set of computing resources is automatically calibrated for throughput for the particular service;
  allocating and configuring the set of computing resources to provide the particular service for the future period of time;
  determining a second projected service call volume for the particular service for a second future period of time;
  determining a second set of computing resources to support the second projected service call volume for the particular service, wherein the second set of computing resources comprises fewer computing resources than the set of computing resources; and
  returning at least a portion of the set of computing resources to a global pool, wherein the global pool comprises a plurality of computing resources available to one or more other services of the plurality of services.

14. The non-transitory, computer-readable storage medium as recited in claim 13, wherein the set of computing resources is determined based on an efficiency index, wherein the efficiency index is determined as an optimum throughput divided by a peak actual throughput for the particular service over a period of time using one or more of the set of computing resources.

15. The non-transitory, computer-readable storage medium as recited in claim 13, wherein the program instructions are further computer-executable to perform:
  determining a forecast for one or more demand drivers for the future period of time, wherein the projected service call volume is determined based on the forecast for the one or more demand drivers.

16. The non-transitory, computer-readable storage medium as recited in claim 13, wherein the projected service call volume is determined based on automated analysis of trace data for individual services of the plurality of services, wherein the automated analysis of the trace data determines one or more relationships between the particular service and individual demand drivers.

17. The non-transitory, computer-readable storage medium as recited in claim 13, wherein the projected service call volume is determined based on a time-series analysis of service call volume history for the particular service.

18. The non-transitory, computer-readable storage medium as recited in claim 13, wherein at least a portion of the set of computing resources are allocated from a global pool, wherein the global pool comprises a plurality of computing resources available to one or more other services of the plurality of services.

19. The non-transitory, computer-readable storage medium as recited in claim 13, wherein the program instructions are further computer-executable to perform:
  determining that a global pool of computing resources is insufficient to fulfill the set of computing resources, wherein the global pool comprises a plurality of computing resources available to individual services of the plurality of services; and
  purchasing or leasing additional computing resources to fulfill the set of computing resources.

20. The non-transitory, computer-readable storage medium as recited in claim 13, wherein the program instructions are further computer-executable to perform:
  monitoring performance of the set of computing resources after the set of resources is calibrated for throughput for the particular service;
  determining that the performance is not within predetermined boundaries; and
  in response to determining that the performance is not within the predetermined boundaries, recalibrating the set of computing resources for throughput for the particular service.

* * * * *